(12) United States Patent
Zhang et al.

(10) Patent No.: US 11,194,422 B2
(45) Date of Patent: Dec. 7, 2021

(54) METHOD AND APPARATUS FOR PREVENTING MISOPERATION ON EDGE OF TOUCH SCREEN

(71) Applicant: SHENZHEN GOODIX TECHNOLOGY CO., LTD., Guangdong (CN)

(72) Inventors: Ping Zhang, Guangdong (CN); Deng Cheng, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 164 days.

(21) Appl. No.: 15/801,371

(22) Filed: Nov. 2, 2017

(65) Prior Publication Data

US 2018/0052565 A1  Feb. 22, 2018

Related U.S. Application Data

(63) Continuation of application No. PCT/CN2016/087930, filed on Jun. 30, 2016.

(51) Int. Cl.
  *G06F 3/041* (2006.01)
  *G06F 3/0488* (2013.01)
  *G06F 3/044* (2006.01)

(52) U.S. Cl.
  CPC ............ *G06F 3/0418* (2013.01); *G06F 3/044* (2013.01); *G06F 3/0488* (2013.01); *G06F 2203/04104* (2013.01)

(58) Field of Classification Search
  None
  See application file for complete search history.

(56) References Cited

U.S. PATENT DOCUMENTS

2014/0022211 A1*  1/2014  Karpin ............... G06F 3/04182
                                                    345/174
2014/0300559 A1  10/2014  Tanimoto et al.
(Continued)

FOREIGN PATENT DOCUMENTS

CN   102279704 A      7/2011
CN   103176653 A  *   6/2013
(Continued)

OTHER PUBLICATIONS

Xiang, Yunming, Machine Translation of Foreign Patent Document CN 103176653 A, Handheld type device touch control display screen wrong-touch prevention method, pp. 1-2 (Year: 2013).*

(Continued)

*Primary Examiner* — Amr A Awad
*Assistant Examiner* — Maheen I Javed
(74) *Attorney, Agent, or Firm* — Heslin Rothenberg Farly & Mesiti, P.C.

(57) ABSTRACT

A method for preventing a misoperation on an edge of a touch screen includes: determining a first touch region according to touch operation on an edge of a touch screen; forming a second touch region according to coordinate information of touch points in the first touch region; forming a third touch region according to a longest column in the second touch region and a column on a left side of the longest column if the touch points in the second touch region are arranged as parallel to a right edge of the touch screen; judging whether a length-to-width ratio of the third touch region is less than or equal to a predetermined threshold; and determining that the touch operation is a misoperation if the length-to-width ratio is greater than the predetermined threshold.

14 Claims, 18 Drawing Sheets

(56) References Cited

U.S. PATENT DOCUMENTS

| | | | | |
|---|---|---|---|---|
| 2014/0362046 A1* | 12/2014 | Yoshida | ................. | G06F 3/044 |
| | | | | 345/174 |
| 2014/0375608 A1* | 12/2014 | Yumoto | ................. | G06F 3/041 |
| | | | | 345/174 |
| 2015/0149968 A1* | 5/2015 | Sun | ........................ | G06F 3/038 |
| | | | | 715/863 |
| 2017/0031521 A1* | 2/2017 | Drake | .................. | G06F 3/0418 |

FOREIGN PATENT DOCUMENTS

| | | |
|---|---|---|
| CN | 103176653 A | 6/2013 |
| CN | 103235695 A | 8/2013 |
| CN | 103246415 A | 8/2013 |
| CN | 104679362 A | 6/2015 |
| CN | 105426093 A | 3/2016 |
| CN | 105487809 A | 4/2016 |
| EP | 2626778 A2 | 8/2013 |
| EP | 2975499 A | 1/2016 |
| EP | 2975499 A1 | 1/2016 |
| KR | 20160042824 A | 4/2016 |

OTHER PUBLICATIONS

Extended European Search Report for European Patent Application No. 16898154 dated Jun. 20, 2018.
Search Report and First Examination Report for Chinese Patent Application No. 201680000659.4 dated Dec. 3, 2020.

\* cited by examiner

|   | i | ii | iii |
|---|---|----|-----|
| a | 0 | 0  | 3   |
| b | 0 | 0  | 145 |
| c | 0 | 63 | 198 |
| d | 0 | 0  | 109 |
| e | 0 | 0  | 0   |

FIG. 2a

|   | i | ii | iii |
|---|---|----|-----|
| a | 0 | 0  | 3   |
| b | 0 | 0  | 145 |
| c | 0 | 63 | 198 |
| d | 0 | 0  | 109 |
| e | 0 | 0  | 0   |

FIG. 2b

|   | i | ii | iii | iv | v |
|---|---|---|---|---|---|
| a | 0 | 0 | 0 | 0 | 0 |
| b | 0 | 0 | 15 | 57 | 15 |
| c | 0 | 11 | 90 | 213 | 160 |
| d | 0 | 0 | 102 | 237 | 197 |
| e | 0 | 0 | 1 | 79 | 13 |
| f | 0 | 0 | 0 | 0 | 0 |

FIG. 3a

|   | i | ii | iii | iv | v |
|---|---|---|---|---|---|
| a | 0 | 0 | 0 | 0 | 0 |
| b | 0 | 0 | 15 | 57 | 15 |
| c | 0 | 11 | 90 | 213 | 160 |
| d | 0 | 0 | 102 | 237 | 197 |
| e | 0 | 0 | 1 | 79 | 13 |
| f | 0 | 0 | 0 | 0 | 0 |

FIG. 3b

|   | i | ii | iii | iv | v |
|---|---|----|-----|----|----|
| a | 0 | 0 | 0 | 0 | 0 |
| b | 15 | 57 | 15 | 0 | 0 |
| c | 160 | 213 | 90 | 11 | 0 |
| d | 197 | 237 | 102 | 0 | 0 |
| e | 13 | 79 | 1 | 0 | 0 |
| f | 0 | 0 | 0 | 0 | 0 |

FIG. 5a

|   | i | ii | iii | iv | v |
|---|---|----|-----|----|----|
| a | 0 | 0 | 0 | 0 | 0 |
| b | 15 | 57 | 15 | 0 | 0 |
| c | 160 | 213 | 90 | 11 | 0 |
| d | 197 | 237 | 102 | 0 | 0 |
| e | 13 | 79 | 1 | 0 | 0 |
| f | 0 | 0 | 0 | 0 | 0 |

FIG. 5b

|   | i | ii | iii | iv | v | vi |
|---|---|----|-----|----|----|----|
| a | 0 | 15 | 160 | 197 | 13 | 0 |
| b | 0 | 57 | 213 | 237 | 79 | 0 |
| c | 0 | 15 | 90 | 102 | 0 | 0 |
| d | 0 | 0 | 11 | 1 | 0 | 0 |
| e | 0 | 0 | 0 | 0 | 0 | 0 |
| f | 0 | 0 | 0 | 0 | 0 | 0 |

FIG. 7a

|   | i | ii | iii | iv | v | vi |
|---|---|----|-----|----|----|----|
| a | 0 | 15 | 160 | 197 | 13 | 0 |
| b | 0 | 57 | 213 | 237 | 79 | 0 |
| c | 0 | 15 | 90 | 102 | 0 | 0 |
| d | 0 | 0 | 11 | 1 | 0 | 0 |
| e | 0 | 0 | 0 | 0 | 0 | 0 |
| f | 0 | 0 | 0 | 0 | 0 | 0 |

FIG. 7b

|   | i | ii | iii | iv | v | vi |
|---|---|---|---|---|---|---|
| a | 0 | 0 | 0 | 0 | 0 | 0 |
| b | 0 | 0 | 0 | 0 | 0 | 0 |
| c | 0 | 0 | 11 | 1 | 0 | 0 |
| d | 0 | 15 | 90 | 102 | 0 | 0 |
| e | 0 | 57 | 213 | 237 | 79 | 0 |
| f | 0 | 15 | 160 | 197 | 13 | 0 |

FIG. 9a

|   | i | ii | iii | iv | v | vi |
|---|---|---|---|---|---|---|
| a | 0 | 0 | 0 | 0 | 0 | 0 |
| b | 0 | 0 | 0 | 0 | 0 | 0 |
| c | 0 | 0 | 11 | 1 | 0 | 0 |
| d | 0 | 15 | 90 | 102 | 0 | 0 |
| e | 0 | 57 | 213 | 237 | 79 | 0 |
| f | 0 | 15 | 160 | 197 | 13 | 0 |

FIG. 9b

|   | i | ii | iii | iv |
|---|---|----|-----|-----|
| a | 0 | 0  | 3   | 112 |
| b | 0 | 14 | 145 | 147 |
| c | 0 | 63 | 198 | 198 |
| d | 0 | 0  | 29  | 89  |
| e | 0 | 0  | 0   | 0   |

United States Patent 11,194,422 B2

METHOD AND APPARATUS FOR PREVENTING MISOPERATION ON EDGE OF TOUCH SCREEN

CROSS-REFERENCE TO RELATED APPLICATION

The present application is a continuation of international application No. PCT/CN2016/087930 filed on Jun. 30, 2016, which is hereby incorporated by reference herein, in its entirety.

TECHNICAL FIELD

The present disclosure relates to the technical field of touch screens, and in particular, relates to a method and apparatus for preventing a misoperation on an edge of a touch screen.

BACKGROUND

With increase of a screen size of mobile terminals and decrease of a screen edge, the probability of misoperations generated during operation of the mobile terminals with a single hand is higher and higher. For example, when a user holding the mobile terminal with a single hand, the palm may accidentally touches an edge of the touch screen. In this case, the touch screen may detect the touch and report a touch event, thus a corresponding operation may be performed. However, in this case, the user does not intend to perform this operation. As a result, misoperations are caused, and thus the user's touch experience is affected.

If such misoperations are identified and thus a touch operation event caused by such misoperations is refused to report, incorrect operation instructions may not be executed to prevent generating misoperations. At present, how to accurately identify whether touch operations performed by the user on the edge of the touch screen are normal operations or misoperations may be a technical problem to be urgently solved.

SUMMARY

The present disclosure is intended to solve at least one of the above technical problems to some extent.

A first aspect of the present disclosure provides a method for preventing a misoperation on an edge of a touch screen. The method accurately identifies misoperations and improves accuracy of misoperation identification.

To achieve the above objective, an embodiment of the present disclosure provides a method for preventing a misoperation on an edge of a touch screen. The method includes: determining a first touch region according to a touch operation on an edge of a touch screen; forming a second touch region according to coordinate information of touch points in the first touch region; forming a third touch region according to a longest column in the second touch region and a column on a left side of the longest column if the touch points in the second touch region are arranged as parallel to a right edge of the touch screen; judging whether a length-to-width ratio of the third touch region is less than or equal to a predetermined threshold; determining that the touch operation is normal operation if the length-to-width ratio is less than or equal to the predetermined threshold; and determining that the touch operation is misoperation if the length-to-width ratio is greater than the predetermined threshold.

Another embodiment of the present disclosure provides a method for preventing a misoperation on an edge of a touch screen. The method includes: determining a first touch region according to a touch operation on an edge of a touch screen; forming a second touch region according to coordinate information of touch points in the first touch region; forming a fourth touch region according to a longest column in the second touch region and a column on a right side of the longest column if the touch points in the second touch region are arranged as parallel to a left edge of the touch screen; judging whether a length-to-width ratio of the fourth touch region is less than or equal to a predetermined threshold; determining that the touch operation is normal operation if the length-to-width ratio is less than or equal to the predetermined threshold; and determining that the touch operation is misoperation if the length-to-width ratio is greater than the predetermined threshold.

Still another embodiment of the present disclosure provides a method for preventing a misoperation on an edge of a touch screen. The method includes: determining a first touch region according to a touch operation on an edge of a touch screen; forming a second touch region according to coordinate information of touch points in the first touch region; forming a fifth touch region according to a longest row in the second touch region and a row on a lower side of the longest row if the touch points in the second touch region are arranged as parallel to an upper edge of the touch screen; judging whether a length-to-width ratio of the fifth touch region is less than or equal to a predetermined threshold; determining that the touch operation is normal operation if the length-to-width ratio is less than or equal to the predetermined threshold; and determining that the touch operation is misoperation if the length-to-width ratio is greater than the predetermined threshold.

Still another embodiment of the present disclosure provides a method for preventing a misoperation on an edge of a touch screen. The method includes: determining a first touch region according to a touch operation on an edge of a touch screen; forming a second touch region according to coordinate information of touch points in the first touch region; forming a sixth touch region according to a longest row in the second touch region and a row on an upper side of the longest row if the touch points in the second touch region are arranged as parallel to a lower edge of the touch screen; judging whether a length-to-width ratio of the sixth touch region is less than or equal to a predetermined threshold; determining that the touch operation is normal operation if the length-to-width ratio is less than or equal to the predetermined threshold; and determining that the touch operation is misoperation if the length-to-width ratio is greater than the predetermined threshold.

Still another embodiment of the present disclosure provides a method for preventing a misoperation on an edge of a touch screen. The method includes: determining a first touch region according to a touch operation on an edge of a touch screen; forming a second touch region according to coordinate information of touch points in the first touch region; determining a longest column in the second touch region if the touch points in the second touch region are arranged as parallel to a left edge or a right edge of the touch screen, and rectifying the second touch region according to the number of columns on a left side of the longest column and the number of columns on a right side of the longest column, to form a seventh touch region; judging whether a length-to-width ratio of the seventh touch region is less than or equal to a predetermined threshold; determining that the touch operation is normal operation if the length-to-width ratio is less than or equal to the predetermined threshold; and determining that the touch operation is misoperation if the length-to-width ratio is greater than the predetermined threshold.

Still another embodiment of the present disclosure provides a method for preventing a misoperation on an edge of a touch screen. The method includes: determining a first touch region according to a touch operation on an edge of a touch screen; forming a second touch region according to coordinate information of touch points in the first touch region; determining a longest row in the second touch region if the touch points in the second touch region are arranged as parallel to an upper edge or a lower edge of the touch screen and rectifying the second touch region according to the number of rows on an upper side of the longest row and the number of rows on a lower side of the longest row, to form an eighth touch region; judging whether a length-to-width ratio of the eighth touch region is less than or equal to a predetermined threshold; determining that the touch operation is normal operation if the length-to-width ratio is less than or equal to the predetermined threshold; determining that the touch operation is misoperation if the length-to-width ratio is greater than the predetermined threshold.

With the method for preventing a misoperation on an edge of a touch screen according to the embodiment of the present disclosure, a first touch region is determined according to a touch operation on an edge of a touch screen; a second touch region is formed according to coordinate information of touch points in the first touch region; a third touch region is formed according to a longest column or row in the second touch region and a column or row on a left/right/upper/lower side of the longest column or row if the touch points in the second touch region are arranged as parallel to a left, right, upper or lower edge of the touch screen; whether a length-to-width ratio of the third touch region is less than or equal to a predetermined threshold is judged; if the length-to-width ratio is less than or equal to the predetermined threshold, it is determined that the touch operation is normal operation. In this way, misoperations are correctly identified, and thus accuracy of misoperation identification is improved.

The present disclosure further provides a method for processing a touch operation on an edge of a touch screen. The method includes: judging whether a touch area corresponding to a touch operation received on an edge of a touch screen is less than a predetermined area threshold; monitoring whether the touch area corresponding to the touch operation is greater than the predetermined area threshold within a first predetermined time period if the touch area corresponding to the touch operation received on the edge of the touch screen is less than the predetermined area threshold; judging whether the touch operation is misoperation by using the method for preventing a misoperation on an edge of a touch screen as described in the first embodiment if it is monitored that the touch area corresponding to the touch operation is greater than the predetermined area threshold within the first predetermined time period; and performing no response to the touch operation if it is determined that the touch operation is misoperation.

According to the method for processing a touch operation on an edge of a touch screen, when a touch operation is received on the edge of the touch screen, whether the touch area corresponding to the touch operation is less than the predetermined area threshold is judged; and if the touch area corresponding to the touch operation is less than the predetermined area threshold, whether the touch operation is misoperation is further judged within the first predetermined time period; and if it is determined that the touch operation is misoperation, no response is made to the touch operation. In this way, misoperations are accurately identified, and accuracy of misoperation identification is improved.

To achieve the above objective, a second objective of the present disclosure is to provide an apparatus for preventing a misoperation on an edge of a touch screen.

One embodiment of the present disclosure provides an apparatus for preventing a misoperation on an edge of a touch screen. The apparatus includes: a first determining module, configured to determine a first touch region according to a touch operation on an edge of a touch screen; a first forming module, configured to form a second touch region according to coordinate information of touch points in the first touch region; a second forming module, configured to form a third touch region according to a longest column in the second touch region and a column on a left side of the longest column if touch points in the second touch region are arranged as parallel to a right edge of the touch screen; a first judging module, configured to judge whether a length-to-width ratio of the third touch region is less than or equal to a predetermined threshold; a first identifying module, configured to determine that the touch operation is normal operation if the length-to-width ratio of the third touch region is less than or equal to the predetermined threshold; and a second determining module, configured to determine that the touch operation is misoperation if the length-to-width ratio of the third touch region is greater than the predetermined threshold.

With the apparatus for preventing a misoperation on an edge of a touch screen according to the embodiment of the present disclosure, a first touch region is determined according to a touch operation on an edge of a touch screen; a second touch region is formed according to coordinate information of touch points in the first touch region; a third touch region is formed according to a longest column in the second touch region and a column on a left side of the longest column if the touch points in the second touch region are arranged as parallel to a right edge of the touch screen; whether a length-to-width ratio of the third touch region is less than or equal to a predetermined threshold is judged; it is determined that the touch operation is normal operation if the length-to-width ratio is less than or equal to the predetermined threshold; and it is determined that the touch operation is misoperation if the length-to-width ratio is greater than the predetermined threshold. In this way, misoperations are correctly identified, and thus accuracy of misoperation identification is improved.

Likewise, another embodiment of the present disclosure provides an apparatus for preventing a misoperation on an edge of a touch screen. The apparatus includes: a first determining module, configured to determine a first touch region according to a touch operation on an edge of a touch screen; a first forming module, configured to form a second touch region according to coordinate information of touch points in the first touch region; a third forming module, configured to form a fourth touch region according to a longest column in the second touch region and a column on a right side of the longest column if touch points in the second touch region are arranged as parallel to a left edge of the touch screen; a second judging module, configured to judge whether a length-to-width ratio of the fourth touch region is less than or equal to a predetermined threshold; a third identifying module, configured to determine that the touch operation is normal operation if the length-to-width ratio of the fourth touch region is less than or equal to the predetermined threshold; and a fourth identifying module, configured to determine that the touch operation is misoperation if the length-to-width ratio of the fourth touch region is greater than the predetermined threshold.

Likewise, another embodiment of the present disclosure provides an apparatus for preventing a misoperation on an edge of a touch screen. The apparatus includes: a first determining module, configured to determine a first touch region according to a touch operation on an edge of a touch screen; a first forming module, configured to form a second touch region according to coordinate information of touch points in the first touch region; a fourth forming module, configured to form a fifth touch region according to a longest row in the second touch region and the row on a lower side of the longest row if touch points in the second touch region are arranged as parallel to an upper edge of the touch screen; a third judging module, configured to judge whether a length-to-width ratio of the fifth touch region is less than or equal to a predetermined threshold; a fifth identifying module, configured to determine that the touch operation is normal operation if the length-to-width ratio of the fifth touch region is less than or equal to the predetermined threshold; and a sixth identifying module, configured to determine that the touch operation is misoperation if the length-to-width ratio of the fifth touch region is greater than the predetermined threshold.

Likewise, another embodiment of the present disclosure provides an apparatus for preventing a misoperation on an edge of a touch screen. The apparatus includes: a first determining module, configured to determine a first touch region according to a touch operation on an edge of a touch screen; a first forming module, configured to form a second touch region according to coordinate information of touch points in the first touch region; a fifth forming module, configured to form a sixth touch region according to a longest row in the second touch region and the row on an upper side of the longest row if touch points in the second touch region are arranged as parallel to a lower edge of the touch screen; a fourth judging module, configured to judge whether a length-to-width ratio of the sixth touch region is less than or equal to a predetermined threshold; a seventh identifying module, configured to determine that the touch operation is normal operation if the length-to-width ratio of the sixth touch region is less than or equal to the predetermined threshold; and an eighth identifying module, configured to determine that the touch operation is misoperation if the length-to-width ratio of the sixth touch region is greater than the predetermined threshold.

Likewise, another embodiment of the present disclosure provides an apparatus for preventing a misoperation on an edge of a touch screen. The apparatus includes: a second determining module, configured to determine a first touch region according to a touch operation on an edge of a touch screen; a seventh forming module, configured to form a second touch region according to coordinate information of touch points in the first touch region; an eighth forming module, configured to determine a longest column in the second touch region if the touch points in the second touch region are arranged as parallel to a left edge or a right edge of the touch screen, and rectify the second touch region according to a column on a left side of the longest column and the column on a right side of the longest column, to form a seventh touch region; a seventh judging module, configured to judge whether a length-to-width ratio of the seventh touch region is less than or equal to a predetermined threshold; a ninth identifying module, configured to determine that the touch operation is normal operation if the length-to-width ratio of the seventh touch region is less than or equal to the predetermined threshold; and a tenth identifying module, configured to determine that the touch operation is misoperation if the length-to-width ratio of the seventh touch region is greater than the predetermined threshold.

Likewise, another embodiment of the present disclosure provides an apparatus for preventing a misoperation on an edge of a touch screen. The apparatus includes: a ninth forming module, configured to determine a longest row in the second touch region if the touch points in the second touch region are arranged as parallel to an upper edge or a lower edge of the touch screen, and rectify the second touch region according to the number of rows on an upper side of the longest row and the number of rows on a lower side of the longest row, to form an eighth touch region; an eighth judging module, configured to judge whether a length-to-width ratio of the eighth touch region is less than or equal to a predetermined threshold; an eleventh identifying module, configured to determine that the touch operation is normal operation if the length-to-width ratio of the eighth touch region is less than or equal to the predetermined threshold; and a twelfth identifying module, configured to determine that the touch operation is misoperation if the length-to-width ratio of the eighth touch region is greater than the predetermined threshold.

The present disclosure further provides an apparatus for preventing a misoperation on an edge of a touch screen. The apparatus includes: a fifth judging module, configured to judge whether a touch area corresponding to a touch operation received on an edge of a touch screen is less than a predetermined area threshold; a first monitoring module, configured to monitor whether the touch area corresponding to the touch operation is greater than the predetermined area threshold within a first predetermined time period if the touch area corresponding to the touch operation received on the edge of the touch screen is less than the predetermined area threshold; a sixth judging module, configured to judge whether the touch operation is misoperation by using the apparatus for preventing a misoperation on an edge of a touch screen as described in the fifth embodiment if it is monitored that the touch area corresponding to the touch operation is greater than the predetermined area threshold within the first predetermined time period; and a first processing module, configured to perform no response to the touch operation if it is determined that the touch operation is misoperation.

BRIEF DESCRIPTION OF THE DRAWINGS

The above described and/or additional aspects and advantages of the present disclosure would be obvious and simple to understand with reference to the description of the embodiments in combination with the accompanying drawings.

FIG. 2a is a schematic diagram of sensing signal data generated at a touched position of a touch screen;

FIG. 2b is a schematic diagram of sensing signal data including a second touch region;

FIG. 3a is another schematic diagram of the sensing signal data including a second touch region;

FIG. 3b is a schematic diagram of sensing signal data including a third touch region;

FIG. 5a is still another schematic diagram of the sensing signal data including a second touch region;

FIG. 5b is a schematic diagram of sensing signal data including a fourth touch region;

FIG. 7a is still another schematic diagram of the sensing signal data including a second touch region;

FIG. 7b is a schematic diagram of sensing signal data including a fifth touch region;

FIG. 9a is yet still another schematic diagram of the sensing signal data including a second touch region;

FIG. 9b is a schematic diagram of sensing signal data including a sixth touch region;

DETAILED DESCRIPTION

Figure 1:
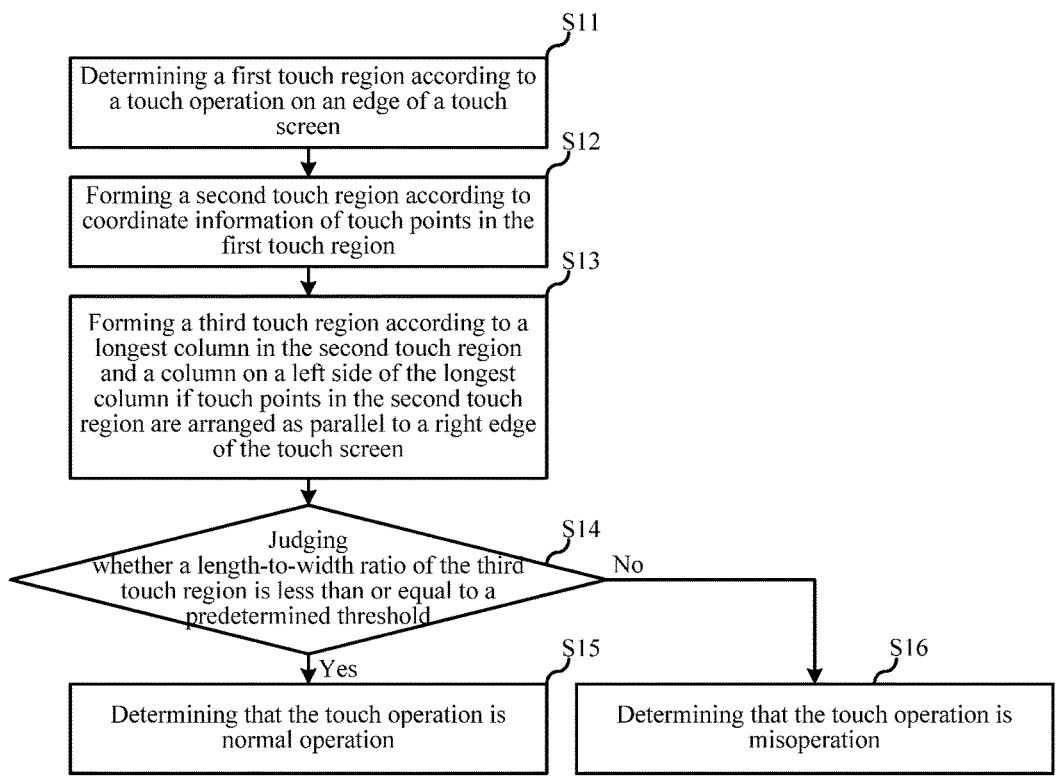
FIG. 1 is a flowchart of a method for preventing a misoperation on an edge of a touch screen according to an embodiment of the present disclosure.

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary, and are intended to illustrate and interpret the present disclosure, which shall not be construed as causing limitations to the present disclosure.

In the course of a user operating a handheld device having a touch screen by hand, fingers may touch an edge of the touch screen, thus capacitance values of a plurality of detection channels proximate to the edge of the touch screen are usually changed. Whether a current touch by the finger is a normal touch or a mistouch may be judged by analyzing characteristics of change in the capacitance value of several detection channels at the edge.

The handheld device may be hardware devices having various operating systems, such as mobile phones, tablet computers, personal digital assistants or the like.

A method for preventing a misoperation on an edge of a touch screen, a method and apparatuses for processing a touch operation according to the embodiments of the present disclosure are described hereinafter in detail with reference to the accompanying drawings.

FIG. 1 is a flowchart of a method for preventing a misoperation on an edge of a touch screen according to an embodiment of the present disclosure. As shown in FIG. 1, the method for preventing a misoperation on an edge of a touch screen may include the following steps.

S11: determining a first touch region according to a touch operation on an edge of a touch screen.

Specifically, during use of a handheld device, if it is monitored that an edge of a touch screen receives a touch operation, a value of capacitance variation of each touch point may be acquired according to the touch operation on the edge of the touch screen, and a region defined by touch points whose values of capacitance variation are greater than a touch threshold is determined as the touch region.

The touch threshold is a predetermined threshold for value of capacitance variation during determination of a touch region. For example, the touch threshold may be set to 40.

For example, the touch threshold may be 40, and FIG. 2a illustrates sensing signal data generated at a touched position of the touch screen, that is, difference data in a region with non-zero value that are extracted from difference data of an N×M array. The region defined by the bold line is the region defined by the touch points whose values of capacitance variation are greater than 40, i.e. the first touch region.

It should be noted that the touch threshold may be configured to different values according to actual needs to accommodate different application scenarios.

It should be noted that the edge of the touch screen includes an upper edge, a lower edge, a left edge and a right edge.

S12: forming a second touch region according to coordinate information of touch points in the first touch region.

In an embodiment of the present disclosure, when it is determined that the first touch region is formed by the touch operation on the edge of the touch screen, a horizontal coordinate and a vertical coordinate of each touch point in the first touch region are acquired. A maximum value and a minimum value of the horizontal coordinates and the vertical coordinates of the touch points in the first touch region are extracted, and the second touch region is formed according to the maximum value and the minimum value of the horizontal coordinates and the maximum value and the minimum value of the vertical coordinates.

Specifically, after the maximum value and the minimum value of the horizontal coordinates and the maximum value and the minimum value of the vertical coordinates in the first touch region, the maximum values and the minimum values are combined to form four vertices of a rectangle region, and the region defined by the four vertices is the second touch region.

For example, with respect to the first touch region as shown in FIG. 2a, the second touch region formed by the maximum value and the minimum value of the horizontal coordinates and vertical coordinates of the touch points in the first touch region is as shown in FIG. 2b.

It should be noted that in the course of a user operating a handheld device, a user's finger may touch any one edge of an upper, a lower, a left and a right edge of the touch screen.

S13: forming a third touch region according to a longest column in the second touch region and a column on a left side of the longest column if touch points in the second touch region are arranged as parallel to a right edge of the touch screen.

When it is determined that the touch points in the second touch region are arranged as parallel to the right edge of the touch screen, a length of each column in the second touch region are calculated, and the position where the longest column in the second touch region is located is determined according to the length of each column. That is, the column where the longest column is located is determined.

The length of a column is measured based on the number of touch points whose values of capacitance variation are greater than the touch threshold in the column.

For example, with respect to the second touch region as shown in FIG. 2b, assuming that the predetermined touch threshold is 40, through calculation, it may be known that one value of capacitance variation in the $ii^{th}$ column is greater than the touch threshold 40, and three values of capacitance variation in the $iii^{th}$ column are greater than the touch threshold 40. In this case, the third touch region may be formed according to the longest column and the column on the left side of the longest column. In this embodiment, the second touch region and the third touch region are the same.

It should be noted that if it is determined that the column where the longest column in the second touch region is located is a border of the touch screen, it may be determined that the third touch region and the second touch region are the same.

Still for example, with respect to the second touch region as shown in FIG. 3a, and assuming that the predetermined touch threshold is 40, through calculation, it may be known that two pieces of data in the $iii^{th}$ column are greater than the touch threshold, four pieces of touch data in the $iv^{th}$ column are greater than the touch threshold, and two pieces of data in the $v^{th}$ column are greater than the touch threshold. In this case, it may be determined that the longest column is the $iv^{th}$ column, and the third touch region may be formed by the $iv^{th}$ column and the $iii^{th}$ column, as shown in FIG. 3b. The region enclosed by the bold line in FIG. 3b is the third touch region.

S14: judging whether a length-to-width ratio of the third touch region is less than or equal to a predetermined threshold.

The predetermined threshold is a predetermined length-to-width ratio threshold, and in this embodiment, the predetermined threshold is 2. In this document, the length and the width are defined as follows: the side where the length is located is parallel to the edge which the second touch region is parallel to, and the side where the width is located is perpendicular to the edge which the second touch region is parallel to. That is, in this embodiment, the second touch region is parallel to the right edge, the side where the length is located is parallel to the right edge, and the side where the width is located is perpendicular to the right edge.

S15: determining the touch operation is normal operation if the length-to-width ratio of the third touch region is less than or equal to the predetermined threshold.

Still for example, with respect to the third touch region as shown in FIG. 2b, it may be calculated that the length-to-width ratio of the third touch region is 1.5, it may be determined through comparison with the predetermined threshold that the length-to-width ratio of the third touch region is less than the predetermined threshold 2, it may be determined that the touch operation on the edge of the touch screen is normal operation, and the handheld device performs a response to the touch operation of the user and executes an instruction corresponding to the touch operation.

For another example, with respect to the third touch region as shown in FIG. 3b, it may be calculated that the length-to-width ratio of the third touch region is 2, it may be determined through comparison with the predetermined threshold that the length-to-width ratio of the third touch region is equal to the predetermined threshold, thus may determine that the touch operation on the edge of the touch screen is normal operation, and the handheld device performs a response to the touch operation of the user and executes an instruction corresponding to the touch operation.

S16: determining the touch operation is misoperation if the length-to-width ratio of the third touch region is greater than the predetermined threshold.

With the method for preventing a misoperation on an edge of a touch screen according to embodiments of the present disclosure, a first touch region is determined according to a touch operation on an edge of a touch screen, and a second touch region is formed according to coordinate information of touch points in the first touch region. If the touch points in the second touch region are arranged as parallel to a right edge of the touch screen, a third touch region is formed according to a longest column in the second touch region and a column on a left side of the longest column. Whether a length-to-width ratio of the third touch region is less than or equal to a predetermined threshold is judged. If the length-to-width ratio is less than or equal to the predetermined threshold, it is determined that the touch operation is normal operation. In this way, misoperations are correctly identified, and the accuracy of misoperation identification may be improved.

Figure 4:
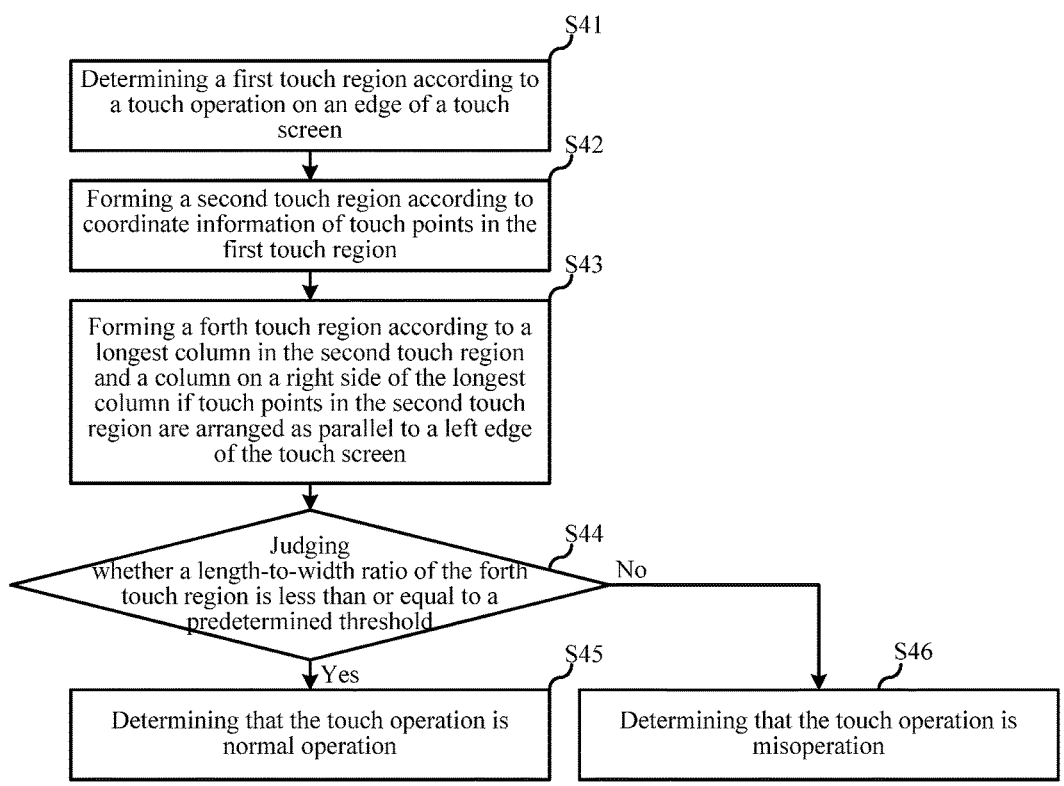
FIG. 4 is a flowchart of a method for preventing a misoperation on an edge of a touch screen according to another embodiment of the present disclosure.

FIG. 4 is a flowchart of a method for preventing a misoperation on an edge of a touch screen according to another embodiment of the present disclosure. As shown in FIG. 4, the method for preventing a misoperation on an edge of a touch screen may include the following steps.

S41: determining a first touch region according to a touch operation on an edge of a touch screen.

Specifically, during use of a handheld device, if it is monitored that an edge of a touch screen receives a touch operation, a value of capacitance variation of each touch point may be acquired according to the touch operation on the edge of the touch screen, and a region defined by touch points whose values of capacitance variation are greater than a touch threshold is determined as the touch region.

The touch threshold is a predetermined threshold for value of capacitance variation during determination of a touch region. For example, the touch threshold may be set to 40.

It should be noted that the touch threshold may be configured to different values according to actual needs to accommodate different application scenarios.

S42: forming a second touch region according to coordinate information of touch points in the first touch region.

In an embodiment of the present disclosure, when it is determined that the first touch region is formed by the touch operation on the edge of the touch screen, a horizontal coordinate and a vertical coordinate of each touch point in the first touch region are acquired, a maximum value and a minimum value of the horizontal coordinates and the vertical coordinates of the touch points in the first touch region are extracted, and the second touch region is formed according to the maximum value and the minimum value of the horizontal coordinates and the maximum value and the minimum value of the vertical coordinates.

Specifically, after the maximum value and the minimum value of the horizontal coordinates and the maximum value and the minimum value of the vertical coordinates in the first touch region, the maximum values and the minimum values are combined to form four vertices of a rectangle region, and the region defined by the four vertices is the second touch region.

S43: forming a fourth touch region according to a longest column in the second touch region and a column on a right side of the longest column in the second touch region if touch points in the second touch region are arranged as parallel to a left edge of the touch screen.

When it is determined that the touch points in the second touch region are arranged as parallel to the left edge of the touch screen, a length of each column in the second touch region are calculated, and the position where the longest column in the second touch region is located is determined according to the length of each column. That is, the column where the longest column is located is determined.

If it is determined the column where the longest column in the second touch region is located is a left border of the touch screen, the region formed according to the longest column in the second touch region and the column on the right side of the longest column is the same as the second touch region. That is, the fourth touch region and the second touch region are the same.

The length of a column is measured based on the number of touch points in the column whose values of capacitance variation are greater than the touch threshold.

If it is determined that the longest column in the second touch region is not the left border of the touch screen, a region may be formed according to the longest column in the second touch region and the column on the right side of the longest column. The formed region is the fourth touch region.

For example, as shown in FIG. 5a, with respect to the second touch region as shown in FIG. 5a, assuming that the $i^{th}$ column is the left border of the touch screen, through calculation, it may be known that two values of capacitance variation in the $i^{th}$ column in the second touch region are greater than the touch threshold 40, four values of capacitance variation in the $ii^{th}$ column are greater than the touch threshold 40, and two values of capacitance variation in the $iii^{th}$ column are greater than the touch threshold 40. In this case, it may be determined that the longest column in the second touch region is the $ii^{th}$ column, and the region formed according to the longest column in the second touch region and the column on the right side of the longest column is the fourth touch region. As shown in FIG. 5b, the region enclosed by the bold line in FIG. 5b can be regarded as the fourth touch region.

S44: judging whether a length-to-width ratio of the fourth touch region is less than or equal to a predetermined threshold.

The predetermined threshold is a predetermined length-to-width ratio threshold, and in this embodiment, the predetermined threshold may be 2. In this document, the length and the width are defined as follows: the side where the length is located is parallel to the edge which the second touch region is parallel to, and the side where the width is located is perpendicular to the edge which the second touch region is parallel to. That is, in this embodiment, the second touch region is parallel to the left edge, the side where the length is located is parallel to the left edge, and the side where the width is located is perpendicular to the left edge.

S45: determining the touch operation is normal operation if the length-to-width ratio of the fourth touch region is less than or equal to the predetermined threshold.

Still for example, with respect to the fourth touch region as shown in FIG. 5b, it may be calculated that the length-to-width ratio of the fourth touch region is 2, it may be determined that the length-to-width ratio of the fourth touch region is equal to the predetermined threshold through comparing this calculated ratio with the predetermined threshold, it may be determined that the touch operation on the edge of the touch screen is normal operation, and the handheld device performs a response to the touch operation of the user and executes an instruction corresponding to the touch operation.

S46: determining the touch operation is misoperation if the length-to-width ratio of the fourth touch region is greater than the predetermined threshold.

With the method for preventing a misoperation on an edge of a touch screen according to the embodiment of the present disclosure, a first touch region is determined according to a touch operation on an edge of a touch screen, and a second touch region is formed according to coordinate information of touch points in the first touch region. If the touch points in the second touch region are arranged as parallel to a left edge of the touch screen, a fourth touch region is formed according to a longest column in the second touch region and a column on a right side of the longest column. Whether a length-to-width ratio of the fourth touch region is less than or equal to a predetermined threshold is judged. If the length-to-width ratio is less than or equal to the predetermined threshold, it is determined that the touch operation is normal operation. In this way, misoperations may be correctly identified, and thus accuracy of misoperation identification is improved.

Figure 6:
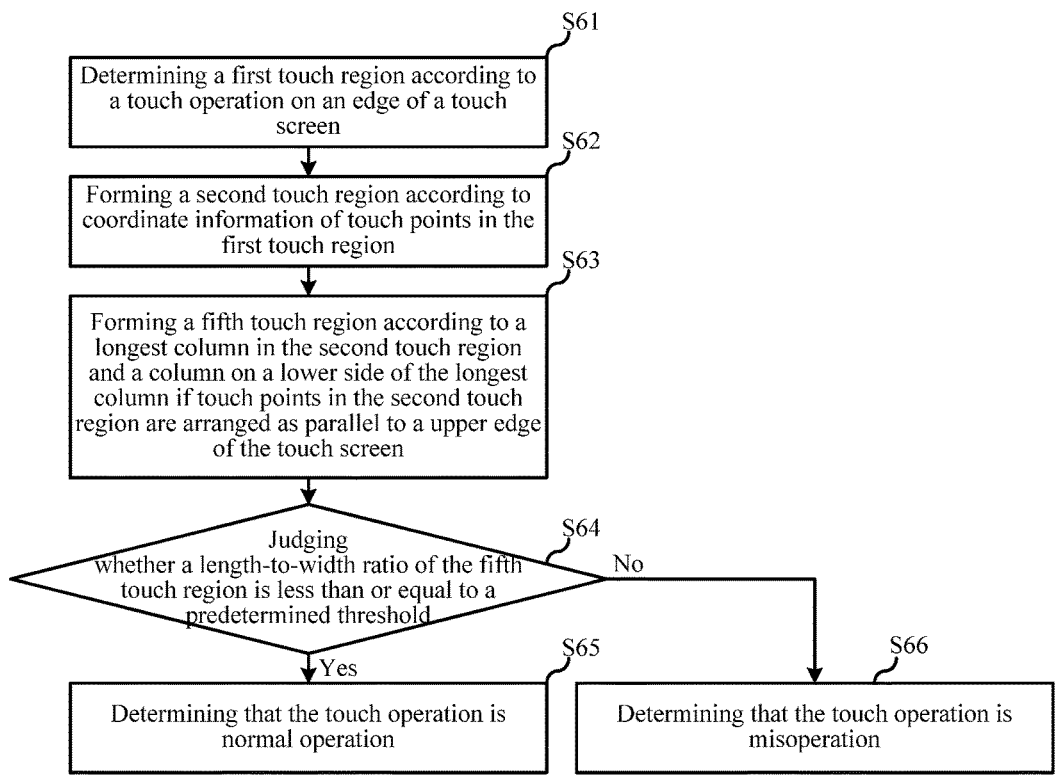
FIG. 6 is a flowchart of a method for preventing a misoperation on an edge of a touch screen according to still another embodiment of the present disclosure.

FIG. 6 is a flowchart of a method for preventing a misoperation on an edge of a touch screen according to still another embodiment of the present disclosure. As shown in FIG. 6, the method for preventing a misoperation on an edge of a touch screen may include the following steps.

S61: determining a first touch region according to a touch operation on an edge of a touch screen.

Specifically, during use of a handheld device, if it is monitored that an edge of a touch screen receives a touch operation, a value of capacitance variation of each touch point may be acquired according to the touch operation on the edge of the touch screen, and a region defined by touch points whose values of capacitance variation are greater than a touch threshold is determined as the touch region.

The touch threshold is a predetermined threshold for value of capacitance variation during determination of a touch region. For example, the touch threshold may be set to 40.

It should be noted that the touch threshold may be configured to different values according to actual needs to accommodate different application scenarios.

S62: forming a second touch region according to coordinate information of touch points in the first touch region.

In an embodiment of the present disclosure, when it is determined that the first touch region is formed by the touch operation on the edge of the touch screen, a horizontal coordinate and a vertical coordinate of each touch point in the first touch region are acquired, a maximum value and a minimum value of the horizontal coordinates and the vertical coordinates of the touch points in the first touch region are extracted, and the second touch region is formed according to the maximum value and the minimum value of the horizontal coordinates and the maximum value and the minimum value of the vertical coordinates.

Specifically, after the maximum value and the minimum value of the horizontal coordinates and the maximum value and the minimum value of the vertical coordinates in the first touch region, the maximum value and the minimum value are combined to form four vertices of a rectangle region, and the region defined by the four vertices is the second touch region.

S63: forming a fifth touch region according to a longest row in the second touch region and a row on a lower side of the longest row if touch points in the second touch region are arranged as parallel to an upper edge of the touch screen.

When it is determined that the touch points in the second touch region are arranged as parallel to the upper edge of the touch screen, a length of each row in the second touch region are calculated, and the position where the longest row in the second touch region is located is determined according to the length of each row.

If it is determined the row where the longest row in the second touch region is located is an upper border of the touch screen, the region formed according to the longest row in the second touch region and the row on the lower side of the longest row is the same as the second touch region. That is, the fifth touch region and the second touch region are the same.

The length of a row is measured based on the number of touch points in the row whose values of capacitance variation are greater than the touch threshold.

If it is determined that the longest row in the second touch region is located is not the upper border of the touch screen, a region may be formed according to the longest row in the second touch region and the row on the right side of the longest row. The formed region is the fifth touch region.

For example, as shown in FIG. 7a, with respect to the second touch region as shown in FIG. 7a, assuming that the $a^{th}$ row is the upper border of the touch screen, through calculation, it may be known that two values of capacitance variation in the $a^{th}$ row in the second touch region are greater than the touch threshold 40, four values of capacitance variation in the $b^{th}$ row are greater than the touch threshold 40, and two values of capacitance variation in the $c^{th}$ row are greater than the touch threshold 40. In this case, it may be determined that the longest row in the second touch region is the $b^{th}$ row, and the region formed according to the longest row in the second touch region and the row on the lower side of the longest row is the fifth touch region. As shown in FIG. 7b, the region enclosed by the bold line in FIG. 7b is the fifth touch region.

S64: judging whether a length-to-width ratio of the fifth touch region is less than or equal to a predetermined threshold.

The predetermined threshold is a predetermined length-to-width ratio threshold, and in this embodiment, the predetermined threshold is 2. In this document, the length and the width are defined as follows: the side where the length is located is parallel to the edge which the second touch region is parallel to, and the side where the width is located is perpendicular to the edge which the second touch region is parallel to. That is, in this embodiment, the second touch region is parallel to the upper edge, the side where the length is located is parallel to the upper edge, and the side where the width is located is perpendicular to the upper edge.

S65: determining the touch operation is normal operation if the length-to-width ratio of the fifth touch region is less than or equal to the predetermined threshold.

Still for example, with respect to the fifth touch region as shown in FIG. 7b, it may be calculated that the length-to-width ratio of the fifth touch region is 2, it may be determined that the length-to-width ratio of the fifth touch region is equal to the predetermined threshold through comparing this calculated ratio with the predetermined threshold, it may be determined that the touch operation on the edge of the touch screen is normal operation, and the handheld device performs a response to the touch operation of the user and executes an instruction corresponding to the touch operation.

S66: determining the touch operation is misoperation if the length-to-width ratio of the fifth touch region is greater than the predetermined threshold.

With the method for preventing a misoperation on an edge of a touch screen according to the embodiment of the present disclosure, a first touch region is determined according to a touch operation on an edge of a touch screen, and a second touch region is formed according to coordinate information of touch points in the first touch region. If the touch points in the second touch region are arranged as parallel to an upper edge of the touch screen, a fifth touch region is formed according to a longest row in the second touch region and a row on a lower side of the longest row. Whether a length-to-width ratio of the fifth touch region is less than or equal to a predetermined threshold is judged. If the length-to-width ratio is less than or equal to the predetermined threshold, it is determined that the touch operation is normal operation. In this way, misoperations may be correctly identified, and thus accuracy of misoperation identification is improved.

Figure 8:
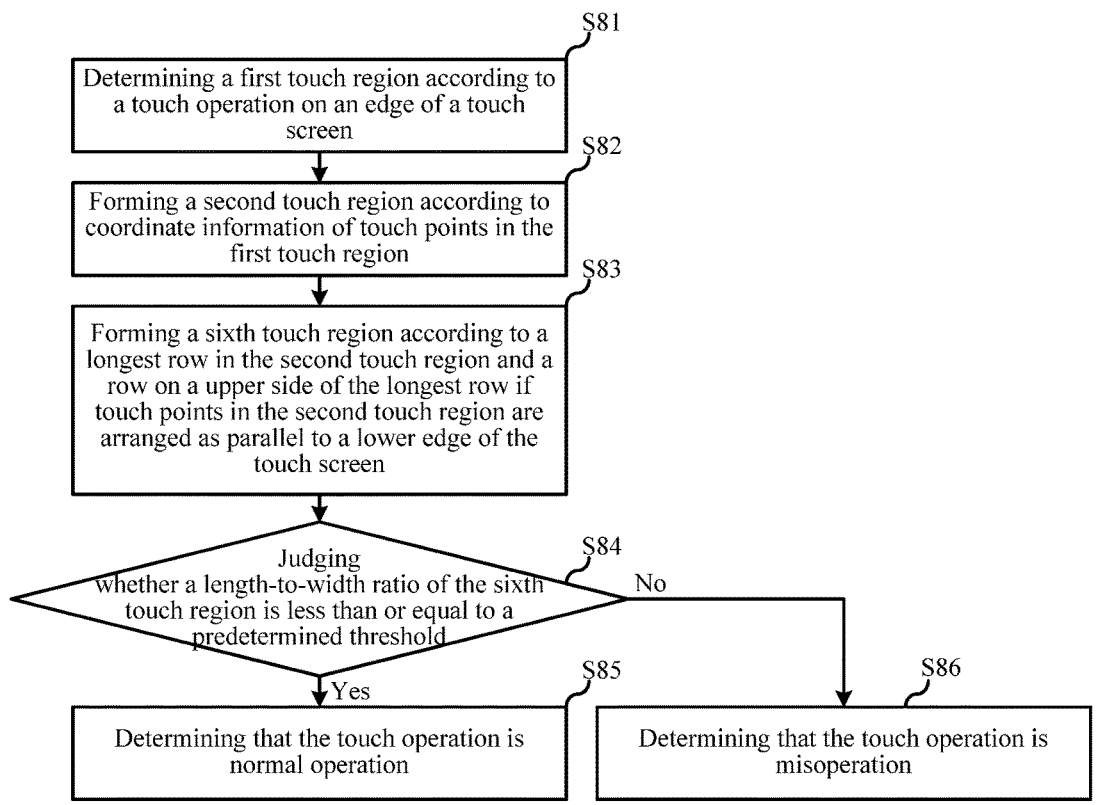
FIG. 8 is a flowchart of a method for preventing a misoperation on an edge of a touch screen according to yet still another embodiment of the present disclosure.

FIG. 8 is a flowchart of a method for preventing a misoperation on an edge of a touch screen according to yet still another embodiment of the present disclosure. As shown in FIG. 8, the method for preventing a misoperation on an edge of a touch screen may include the following steps.

S81: determining a first touch region according to a touch operation on an edge of a touch screen.

Specifically, during use of a handheld device, if it is monitored that an edge of a touch screen receives a touch operation, a value of capacitance variation of each touch point may be acquired according to the touch operation on the edge of the touch screen, and a region defined by touch points whose values of capacitance variation are greater than a touch threshold is determined as the touch region.

The touch threshold is a predetermined threshold for value of capacitance variation during determination of a touch region. For example, the touch threshold may be set to 40.

It should be noted that the touch threshold may be configured to different values according to actual needs to accommodate different application scenarios.

S82: forming a second touch region according to coordinate information of touch points in the first touch region.

In an embodiment of the present disclosure, when it is determined that the first touch region is formed by the touch operation on the edge of the touch screen, a horizontal coordinate and a vertical coordinate of each touch point in the first touch region are acquired, a maximum value and a minimum value of the horizontal coordinates and the vertical coordinates of the touch points in the first touch region are extracted, and the second touch region is formed according to the maximum value and the minimum value of the horizontal coordinates and the maximum value and the minimum value of the vertical coordinates.

Specifically, after the maximum value and the minimum value of the horizontal coordinates and the maximum value and the minimum value of the vertical coordinates in the first touch region, the maximum value and the minimum value are combined to form four vertices of a rectangle region, and the region defined by the four vertices is the second touch region.

S83: forming a sixth touch region according to a longest row in the second touch region and a row on an upper side of the longest row if touch points in the second touch region are arranged as parallel to a lower edge of the touch screen.

When it is determined that the touch points in the second touch region are arranged as parallel to the lower edge of the touch screen, a length of each row in the second touch region are calculated, and the position where the longest row in the second touch region is located is determined according to the length of each row. That is, the row where the longest row is located is determined.

If it is determined the row where the longest row in the second touch region is located is a lower border of the touch screen, the region formed according to the longest row in the second touch region and the row on the upper side of the longest row is the same as the second touch region. That is, the sixth touch region and the second touch region are the same.

The length of a row is measured based on the number of touch points in the row whose values of capacitance variation are greater than the touch threshold.

If it is determined that the longest row in the second touch region is located is not the lower border of the touch screen, a region may be formed according to the longest row in the second touch region and the row on the upper side of the longest row. The formed region is the sixth touch region.

For example, as shown in FIG. 9a, with respect to the second touch region as shown in FIG. 9a, assuming that the $f^{th}$ row is the lower border of the touch screen, through calculation, it may be known that two values of capacitance variation in the $f^{th}$ row in the second touch region are greater than the touch threshold 40, four values of capacitance variation in the $e^{th}$ row are greater than the touch threshold 40, and two values of capacitance variation in the $d^{th}$ row are greater than the touch threshold 40. In this case, it may be determined that the longest row in the second touch region is the $b^{th}$ row, and the region formed according to the longest row in the second touch region and the row on the upper side of the longest row is the sixth touch region. As shown in FIG. 9b, the region enclosed by the bold line in FIG. 9b is the sixth touch region.

S84: judging whether a length-to-width ratio of the sixth touch region is less than or equal to a predetermined threshold.

The predetermined threshold is a predetermined length-to-width ratio threshold, and in this embodiment, the predetermined threshold is 2. In this document, the length and the width are defined as follows: the side where the length is located is parallel to the edge which the second touch region is parallel to, and the side where the width is located is perpendicular to the edge which the second touch region is parallel to. That is, in this embodiment, the second touch region is parallel to the lower edge, the side where the length is located is parallel to the lower edge, and the side where the width is located is perpendicular to the lower edge.

S85: determining the touch operation is normal operation if the length-to-width ratio of the sixth touch region is less than or equal to the predetermined threshold.

Still for example, with respect to the sixth touch region as shown in FIG. 9b, it may be calculated that the length-to-width ratio of the sixth touch region is 2, it may be determined that the length-to-width ratio of the fourth touch region is equal to the predetermined threshold through comparing this calculated ratio with the predetermined threshold, it may be determined that the touch operation on the edge of the touch screen is normal operation, and the handheld device performs a response to the touch operation of the user and executes an instruction corresponding to the touch operation.

S86: determining the touch operation is misoperation if the length-to-width ratio of the sixth touch region is greater than the predetermined threshold.

With the method for preventing a misoperation on an edge of a touch screen according to the embodiment of the present disclosure, a first touch region is determined according to a touch operation on the edge of the touch screen, and a second touch region is formed according to coordinate information of touch points in the first touch region. A sixth touch region is formed according upper-side rows in the second touch region. Whether a length-to-width ratio of the sixth touch region is less than or equal to a predetermined threshold is judged. If the length-to-width ratio is less than or equal to the predetermined threshold, it is determined that the touch operation is normal operation. In this way, misoperations are correctly identified, and thus accuracy of misoperation identification is improved. In the above embodiments, the touch regions, i.e., the third touch region, the fourth touch region, the fifth touch region and the sixth touch region, formed according to the second touch region in the third steps S13, S43, S63 and S83 in the embodiments are named in sequence differently for being distinguished from each other. However, a person skilled in the art may understand that the third touch region, the fourth touch region, the fifth touch region and the sixth touch region are formed based on the second touch region by using analogous technical means, and thus these touch regions may be uniformly named as the third touch region (different namings for these regions are only for distinguishing from the touch regions formed in the two prior steps in each embodiment). Based on this idea, the method of the above four embodiments may be summarized as including: determining a first touch region according to a touch operation on an edge of a touch screen; forming a second touch region according to coordinate information of touch points in the first touch region; judging whether touch points in the second touch region are arranged as parallel to one edge of the touch screen, and forming a third touch region according to a longest row or column in the second touch region and a row or column adjacent to the longest row or column but not adjacent to the paralleled edge if the touch points in the second touch region are arranged as parallel to one edge of the touch screen; judging whether a length-to-width ratio of the third touch region is less than or equal to a predetermined threshold; determining that the touch operation is normal operation if the length-to-width ratio is less than or equal to the predetermined threshold; and determining that the touch operation is misoperation if the length-to-width ratio is greater than the predetermined threshold.

In each touching process, the contact area may gradually increase, and when the contact area is small, the touch operation may not be determined as misoperation. With respect to this scenario, in another embodiment of the present disclosure, a delayed outputting method is further provided based on the above technical solution. According to this method, a touch position may be firstly backed up when a touch is detected on the edge of the touch screen, but the touch point thereof is not reported (that is, no response is made to the touch operation). Within a specific detection time period, if it is detected that the touch shape is transformed as complying with the characteristics of the misoperations, the touch position is constantly suppressed until the touch point disappear. If the touch shape maintains as the valid touch characteristics, the touch is identified as a valid touch, and the touch point is reported. Specific embodiments based on the above embodiments may be referenced to the corresponding processes or procedures as shown in FIG. 10 and FIG. 11, the details are described in hereinafter.

Figure 10:
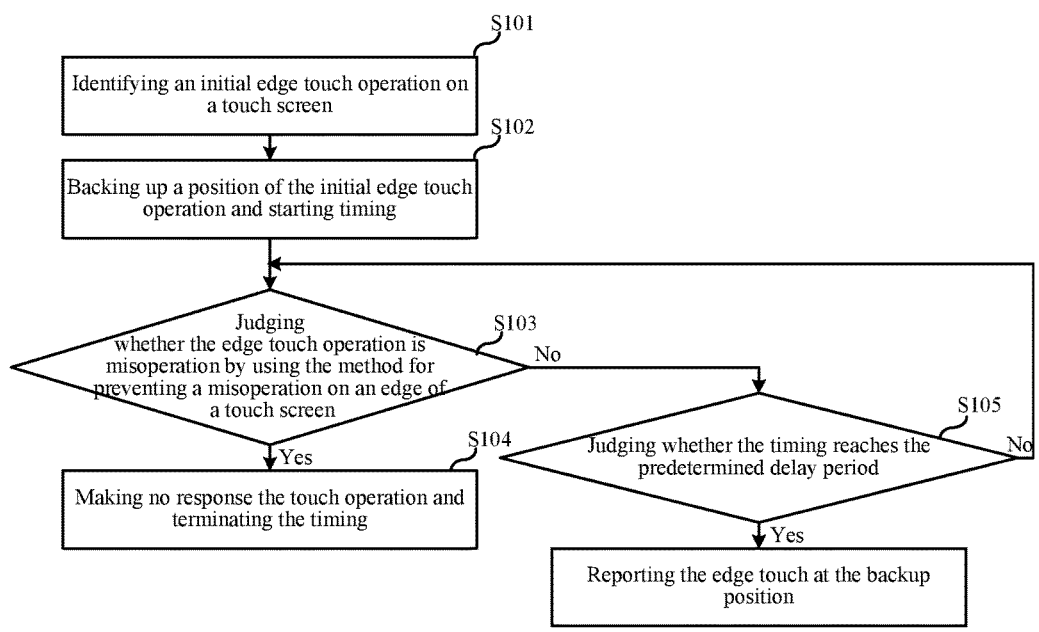
FIG. 10 is a flowchart of a method for processing a touch operation on an edge of a touch screen according to an embodiment of the present disclosure.
Figure 11:
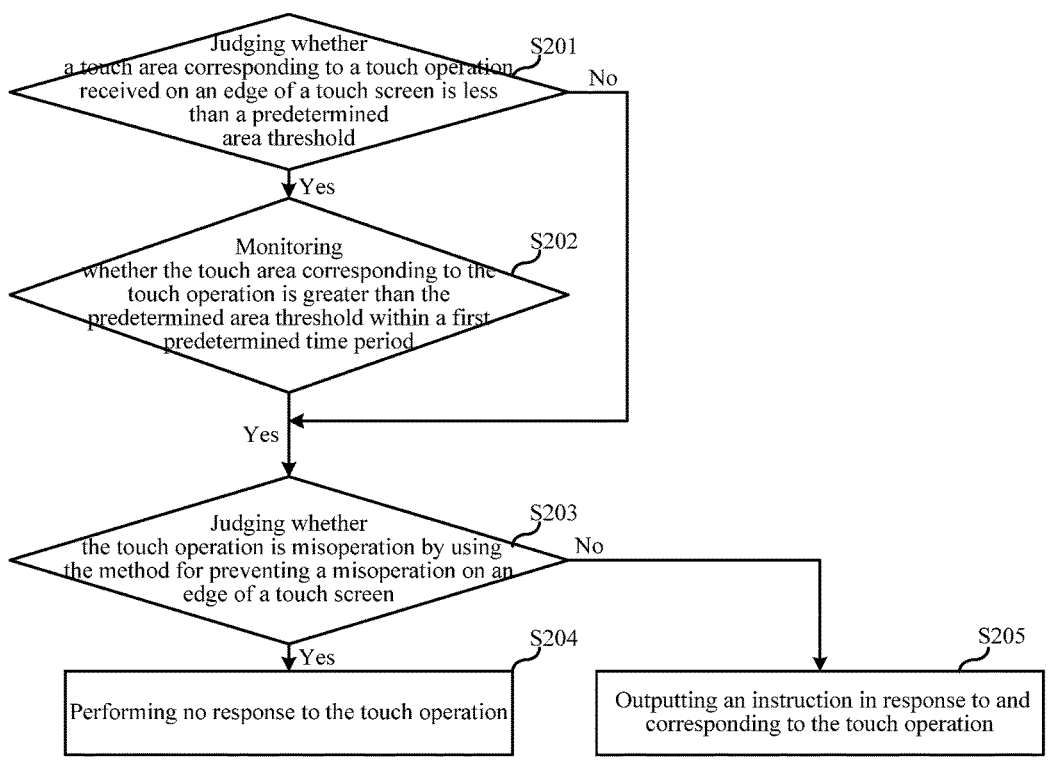
FIG. 11 is a flowchart of a method for preventing a misoperation on an edge of a touch screen according to another embodiment of the present disclosure.

FIG. 10 is a flowchart of a method for processing a touch operation on an edge of a touch screen according to an embodiment of the present disclosure.

As shown in FIG. 10, the method for processing a touch operation on an edge of a touch screen may include the following steps.

S101: identifying an initial edge touch operation on a touch screen.

In this step, the term "initial" is defined as the time point at which a touch operation is firstly generated, and a new touch operation corresponds to a new initial touch operation. In the case of multi-point touch, each touch point or touch of each finger may be considered as different touch operations, thus each touch point or touch of each finger has an initial touch time point respectively. The specific identification of the initial touch operation may be practiced by judging whether a current touch is a scanned new touch action.

S102: backing up a position of the initial edge touch operation and starting timing.

If the touch operation is identified or determined as the initial touch operation, the touch operation is delayed to be reported. That is, the timing is started to enter a predetermined delay period, for example, 100 ms. The predetermined delay period may be set to other values according to actual needs.

S103: judging whether the edge touch operation is misoperation by using the method for preventing a misoperation on an edge of a touch screen. If the edge touch operation is determined as misoperation, step S104 is performed. And if the edge touch operation is determined as normal operation, step S105 is performed.

Within the predetermined delay period, whether the touch operation at the backup position is misoperation is judged by using the method for preventing a misoperation on an edge of a touch screen. Once the touch operation is determined as complying with misoperation, step S104 is performed, that is, no response is made to the touch operation and the timing is terminated. If the touch operation is determined as not complying with misoperation (that is, the touch operation is normal operation), step S105 is performed to judge whether the timing reaches the predetermined delay period.

S104: performing no response to the touch operation and terminating the timing.

At any time point within the predetermined delay period, if it is determined that the edge touch operation at the backup position is misoperation, no response is made to the touch operation and the timing within the delay period is terminated.

S105: judging whether the timing reaches the predetermined delay period. If the timing reaches the predetermined delay period, step S106 is performed and the edge touch operation at the backup position is reported; otherwise, the process returns to step S103.

Within the predetermined delay period, if it is determined that a touch operation at the backup position is normal touch operation, the touch action at the backup position is not instantly reported to the system to perform a corresponding response to the touch operation, that is, the touch operation is not considered as a normal touch operation temporarily, and the touch detection scanning result at the touch positions is continuously refreshed. The touch operation at the backup position is determined as normal operation and reported to the system only if the touch operation at the backup position is still determined as normal operation when/after the timing reaches the predetermined delay period.

S106: reporting the edge touch at the backup position.

The edge touch at the backup position is reported, wherein the backup position is backed up in initial scanning identification of a single touch action, an instruction corresponding to the touch operation is responded/executed, and then the timing within the delay period is terminated.

FIG. 11 is a flowchart of a method for processing a touch operation on an edge of a touch screen according to another embodiment of the present disclosure.

S201: judging whether a touch area corresponding to a touch operation received on an edge of a touch screen is less than a predetermined area threshold. If the touch area corresponding to the touch operation received on the edge of the touch screen is less than the predetermined area threshold, step S202 is performed; otherwise, step S203 is performed.

The predetermined area threshold is a predetermined touch area threshold.

It should be noted that the predetermined area threshold may be configured to different values according to actual needs to accommodate different application scenarios.

S202: monitoring, within a first predetermined time period, whether the touch area corresponding to the touch operation is greater than the predetermined area threshold. If the touch area corresponding to the touch operation is greater than the predetermined area threshold, step S203 is performed.

The first predetermined time period is a predetermined time period for detecting the touch operation. For example, the first predetermined time period may be 100 ms.

It should be noted that the first predetermined time period may be configured to different values according to actual needs to accommodate different application scenarios.

Specifically, when the touch screen is not firmly contacted, judgment of the touch region is not stable, and thus the touch operation may not be determined as misoperation. In this case, touch positions corresponding to the touch operation may be stored, judgment on the above valid touches in the touch region may be constantly performed within the first predetermined time period, e.g. 100 ms, starting from the time when a touch appearing on the edge of the touch screen, and no coordinate is reported during the judgment.

S203: judging whether the touch operation is misoperation by using the method for preventing a misoperation on an edge of a touch screen. If the touch operation is determined as misoperation, step S204 is performed; and if the touch operation is determined as normal operation, step S205 is performed.

The specific process of judging whether the touch operation is misoperation by using the method for preventing a misoperation on an edge of a touch screen may be referenced to the description of the above embodiments, and is thus not described herein any further.

S204: performing no response to the touch operation.

That is, a touch event corresponding to the touch operation is not reported, such that impacts caused by the misoperation to the user are reduced.

S205: outputting an instruction in response to and corresponding to the touch operation.

It should be noted that in an embodiment of the present disclosure, after it is determined within the first predetermined time period that the touch operation is normal operation, if it is detected that the touch points corresponding to the touch operation disappear within the first predetermined time period, it may be determined that the touch event corresponding to the touch operation is tap event, and a corresponding application may be started according to the touch position tapped by the user.

In addition, in an embodiment of the present disclosure, if touch operation is initially detected on the edge of the touch screen, a touch position of the touch operation may be backed up, and timing may be started from the time when the touch operation is initially detected on the edge of the touch screen. If it is detected that the touch points corresponding to the touch operation have a greater displacement within the first predetermined time period, the touch operation may be determined as a valid touch, and normal touch points are output after the initial touch position is output. In this way, the problem that the edge has no output when a finger slides from the edge of the touch screen to the inner region of the touch screen is improved.

According to the method for processing a touch operation on an edge of a touch screen, when a touch operation is received on the edge of the touch screen, whether the touch area corresponding to the touch operation is less than the predetermined area threshold is judged. If the touch area corresponding to the touch operation is less than the predetermined area threshold, whether the touch operation within the first predetermined time period is misoperation is further judged. If it is determined that the touch operation is misoperation, no response is made to the touch operation. In this way, misoperations are accurately identified, and accuracy of misoperation identification is improved.

Figure 12:
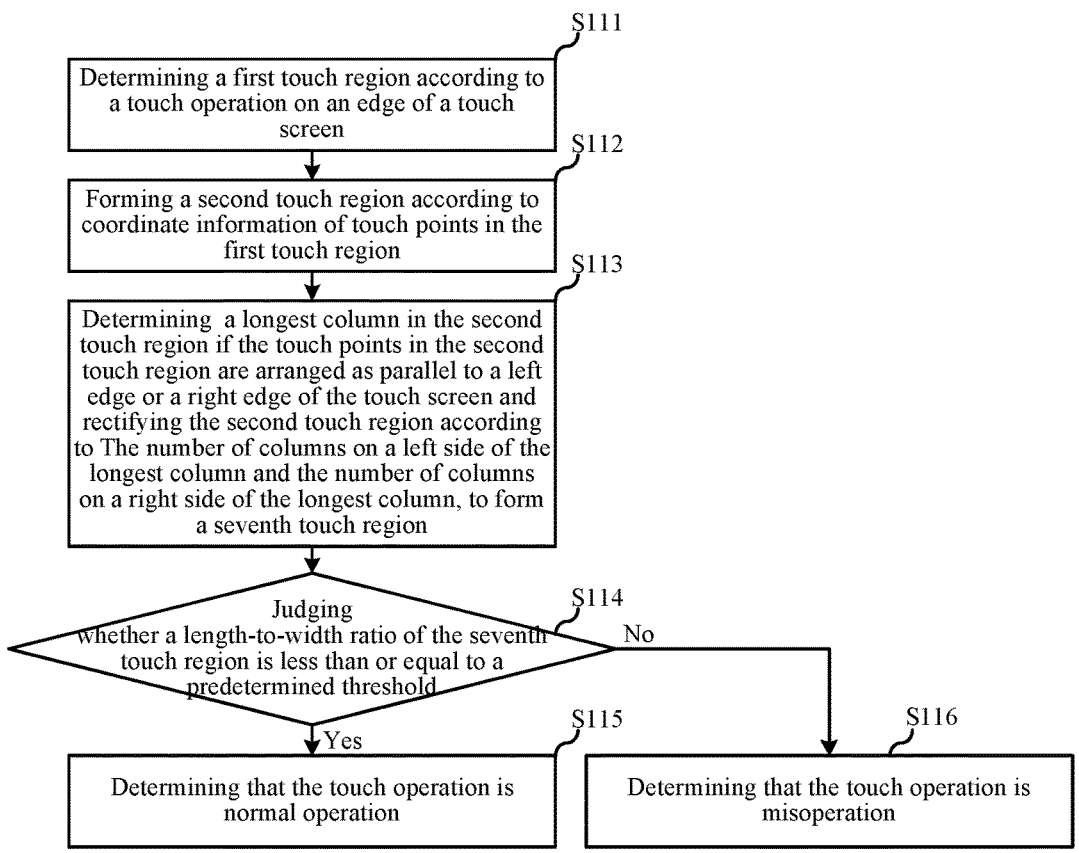
FIG. 12 is a flowchart of a method for preventing a misoperation on an edge of a touch screen according to yet still another embodiment of the present disclosure.

FIG. 12 is a flowchart of a method for preventing a misoperation on an edge of a touch screen according to another embodiment of the present disclosure. As shown in FIG. 12, the method for preventing a misoperation on an edge of a touch screen may include the following steps.

S111: determining a first touch region according to a touch operation on an edge of a touch screen.

Specifically, during use of a handheld device, if it is monitored that an edge of a touch screen receives a touch operation, a value of capacitance variation of each touch point may be acquired according to the touch operation on the edge of the touch screen, and a region defined by touch points whose values of capacitance variation are greater than a touch threshold is determined as the touch region.

The touch threshold is a predetermined threshold for value of capacitance variation during determination of a touch region. For example, the touch threshold may be set to 40.

Figures 13, 14:
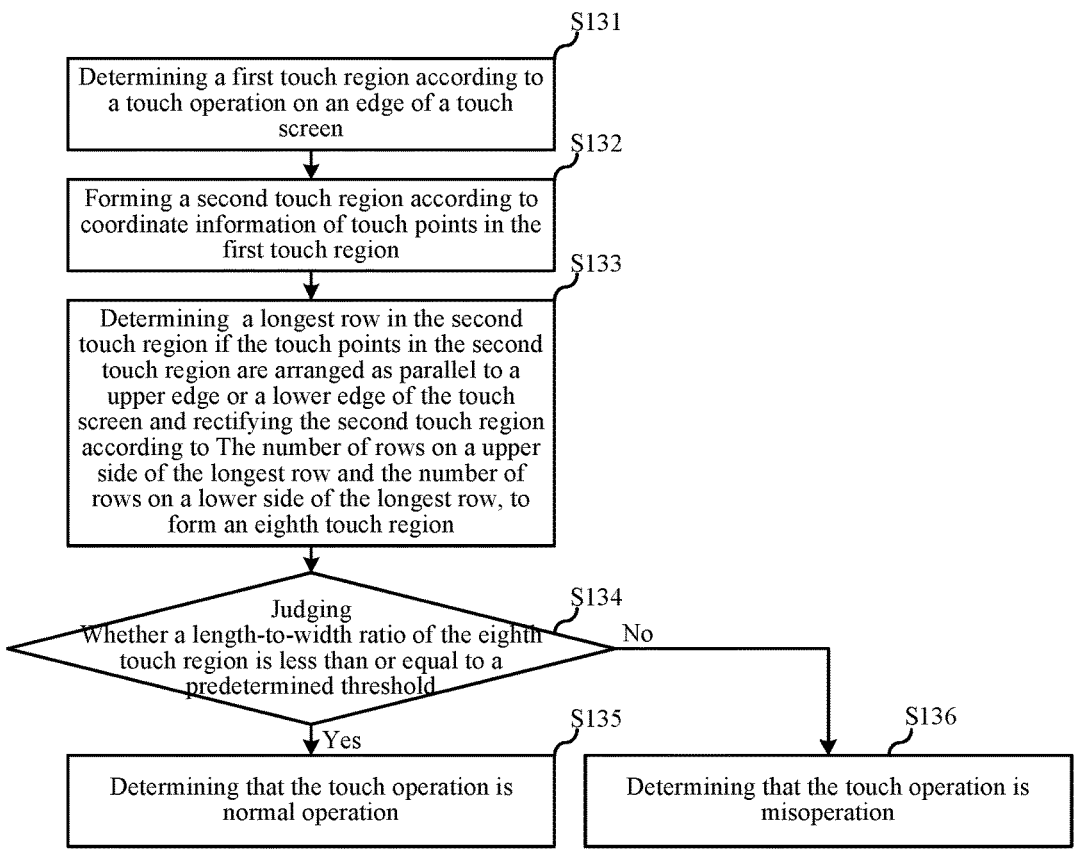
FIG. 13 is a schematic diagram of sensing signal data including a seventh touch region.
FIG. 14 is a flowchart of a method for preventing a misoperation on an edge of a touch screen according to yet still another embodiment of the present disclosure.

For example, the touch threshold is 40, and FIG. 13 illustrates sensing signal data generated at a touched position of the touch screen, that is, difference data in regions with non-zero difference that are extracted from difference data of an N×M array. The region defined by the touch points whose values of capacitance variation are greater than 40 is the first touch region.

It should be noted that the touch threshold may be configured to different values according to actual needs to accommodate different application scenarios.

It should be noted that the edge of the touch screen includes an upper edge, a lower edge, a left edge and a right edge.

S112: forming a second touch region according to coordinate information of touch points in the first touch region.

In an embodiment of the present disclosure, when it is determined that the first touch region is formed by the touch operation on the edge of the touch screen, a horizontal coordinate and a vertical coordinate of each touch point in the first touch region are acquired, a maximum value and a minimum value of the horizontal coordinates and the vertical coordinates of the touch points in the first touch region are extracted, and the second touch region is formed according to the maximum value and the minimum value of the horizontal coordinates and the maximum value and the minimum value of the vertical coordinates.

Specifically, after the maximum value and the minimum value of the horizontal coordinates and the maximum value and the minimum value of the vertical coordinates in the first touch region, the maximum value and the minimum value are combined to form four vertices of a rectangle region, and the region defined by the four vertices is the second touch region.

For example, with respect to the first touch region as shown in FIG. 13, the second touch region formed by the maximum value and the minimum value of the touch points in the first touch region is shown as a box enclosed by the bold line in FIG. 13.

It should be noted that in the course of a user operating a handheld device, a user's finger may touch any one edge of an upper, a lower, a left and a right edge of the touch screen.

S113: If the touch points in the second touch region are arranged as parallel to a left edge or a right edge of the touch screen, determining a longest column in the second touch region, and rectifying the second touch region according to the number of columns on a left side of the longest column and the number of columns on a right side of the longest column, to form a seventh touch region.

When it is determined that the touch points in the second touch region are arranged as parallel to the right edge or the left edge of the touch screen, a column length of each column in the second touch region are calculated, and the position where the longest column in the second touch region is located is determined according to the column length of each column. That is, the column where the longest column is located is determined.

The length of a column is measured based on the number of touch points whose values of capacitance variation are greater than the touch threshold in the column.

When it is determined that the touch points corresponding to the touch operation are partially on the left edge of the touch screen, and the column where the longest column in the second touch region is located is determined, a relationship between the number of columns on the left side of the longest column and the number of columns on the right side of the longest column may be further judged. If the number of columns on the left side of the longest column is greater than the number of columns on the right side of the longest column, N columns are supplemented to the column located on the touch edge. It should be noted that N is equal to a difference obtained by subtracting the number of columns on the right side of the longest column from the number of columns on the left side of the longest column.

For example, the second touch region is as shown in FIG. 13, and through calculation, it may be known that four values of capacitance variation in the iv$^{th}$ column are greater than the touch threshold 40, two values of capacitance variation in the iii$^{th}$ column are greater than the touch threshold, one value of capacitance variation in the ii$^{th}$ column is greater than the touch threshold, and the iv$^{th}$ column is a right border of the touch screen. In this case, two columns may be supplemented to the iv$^{th}$ column to form the seventh touch region. The region obtained after supplementation of the two columns is as shown in FIG. 13. The region enclosed by the bold line in FIG. 13 is the seventh touch region. In this embodiment, the second touch region coincides with the seventh touch region.

In addition, when it is determined that the touch points corresponding to the touch operation are partially on the right edge of the touch screen, and the column where the longest column in the second touch region is located is determined, a relationship between the number of columns on the left side of the longest column and the number of columns on the right side of the longest column may be further judged. If the number of columns on the right side of the longest column is greater than the number of columns on the left side of the longest column, N columns are supplemented to the column located on the touch edge. It should be noted that N is equal to a difference obtained by subtracting the number of columns on the left side of the longest column from the number of columns on the right side of the longest column.

S114: judging whether a length-to-width ratio of the seventh touch region is less than or equal to a predetermined threshold.

S115: determining the touch operation is normal operation if the length-to-width ratio of the seventh touch region is less than or equal to the predetermined threshold.

S116: determining the touch operation is misoperation if the length-to-width ratio of the seventh touch region is greater than the predetermined threshold.

With the method for preventing a misoperation on an edge of a touch screen according to the embodiment of the present disclosure, a first touch region is determined according to a touch operation on an edge of a touch screen. A second touch region is formed according to coordinate information of touch points in the first touch region. A longest column in the second touch region is determined if it is determined that touch points in the second touch region are arranged as parallel to a right edge or a left edge of the touch screen. The second touch region is rectified according to a column on a left side of the longest column and a column on a right side of the longest column, to form a seventh touch region. And the touch operation is determined as normal operation if it is determined that a length-to-width ratio of the seventh touch region is less than or equal to a predetermined threshold. In this way, misoperations are accurately identified, and accuracy of misoperation identification is improved.

FIG. 14 is a flowchart of a method for preventing a misoperation on an edge of a touch screen according to yet still another embodiment of the present disclosure. As shown in FIG. 14, the method for preventing a misoperation on an edge of a touch screen may include the following steps.

S131: determining a first touch region according to a touch operation on an edge of a touch screen.

Specifically, during use of a handheld device, if it is monitored that an edge of a touch screen receives a touch operation, a value of capacitance variation of each touch point may be acquired according to the touch operation on the edge of the touch screen, and a region defined by touch points whose values of capacitance variation are greater than a touch threshold is determined as the first touch region.

The touch threshold is a predetermined threshold for value of capacitance variation during determination of a touch region. For example, the touch threshold may be set to 40.

For example, the touch threshold is 40, and reference may be made to FIG. 2a which illustrates sensing signal data generated at a touched position of the touch screen, that is, difference data in regions with non-zero difference that are extracted from difference data of an N×M array. The region defined by the bold line is the region defined by the touch points whose value of capacitance variation is greater than 40, i.e. the first touch region.

It should be noted that the touch threshold may be configured to different values according to actual needs to accommodate different application scenarios.

It should be noted that the edge of the touch screen includes an upper edge, a lower edge, a left edge and a right edge.

S132: forming a second touch region according to coordinate information of touch points in the first touch region.

In an embodiment of the present disclosure, when it is determined that the first touch region is formed by the touch operation on the edge of the touch screen, a horizontal coordinate and a vertical coordinate of each touch point in the first touch region are acquired. A maximum value and a minimum value of the horizontal coordinates of the touch points in the first touch region are extracted, and a maximum value and a minimum value of the vertical coordinates of the touch points in the first touch region are extracted. The second touch region is formed according to the maximum value and the minimum value of the horizontal coordinates and the maximum value and the minimum value of the vertical coordinates.

Specifically, after the maximum value and the minimum value of the horizontal coordinates and the maximum value and the minimum value of the vertical coordinates in the first touch region, the maximum value and the minimum value are combined to form four vertices of a rectangle region, and the region defined by the four vertices is the second touch region.

It should be noted that in the course of a user operating a handheld device, a user's finger may touch any one edge of an upper, a lower, a left and a right edge of the touch screen.

S133: If the touch points in the second touch region are arranged as parallel to an upper edge or a lower edge of the touch screen, determining a longest row in the second touch region, and rectifying the second touch region according to the number of rows on an upper side of the longest row and the number of rows on a lower side of the longest row, to form an eighth touch region.

When it is determined that the touch points in the second touch region are arranged as parallel to the upper edge or the lower edge of the touch screen, a row length of each row in the second touch region are calculated, and the position where the longest row in the second touch region is located is determined according to the row length of each row. That is, the row where the longest row is located is determined.

The length of a row is measured based on the number of touch points whose values of capacitance variation are greater than the touch threshold in the row.

When it is determined that the touch points corresponding to the touch operation are partially on the upper edge of the touch screen, and the row where the longest row in the second touch region is located is determined, a relationship between the number of rows on the upper side of the longest row and the number of rows on the lower side of the longest row may be further judged. If the number of rows on the upper side of the longest row is greater than the number of rows on the lower side of the longest row, N rows are supplemented to the row located on the touch edge. It should be noted that N is equal to a difference obtained by subtracting the number of rows on the lower side of the longest row from the number of rows on the upper side of the longest row.

In addition, when it is determined that the touch points corresponding to the touch operation are partially on the upper edge of the touch screen, and the row where the longest row in the second touch region is located is determined, a relationship between the number of rows on the upper side of the longest row and the number of rows on the lower side of the longest row may be further judged. If the number of rows on the upper side of the longest row is greater than the number of rows on the lower side of the longest row, N rows are supplemented to the row located on the touch edge. It should be noted that N is equal to a difference obtained by subtracting the number of rows on the lower side of the longest row from the number of rows on the upper side of the longest row.

S134: judging whether a length-to-width ratio of the eighth touch region is less than or equal to a predetermined threshold.

S135: determining the touch operation is normal operation if the length-to-width ratio of the eighth touch region is less than or equal to the predetermined threshold.

S136: determining the touch operation is misoperation if the length-to-width ratio of the eighth touch region is greater than the predetermined threshold.

With the method for preventing a misoperation on an edge of a touch screen according to the embodiment of the present disclosure, a first touch region is determined according to a touch operation on an edge of a touch screen. A second touch region is formed according to coordinate information of touch points in the first touch region. A longest row in the second touch region is determined if it is determined that touch points in the second touch region are arranged as parallel to an upper edge or a lower edge of the touch screen. The second touch region is rectified according to a row on an upper side of the longest row and a row on a lower side of the longest row, to form an eighth touch region. And the touch operation is determined as normal operation if it is determined that a length-to-width ratio of the eighth touch region is less than or equal to a predetermined threshold. In this way, misoperations are accurately identified, and accuracy of misoperation identification is improved.

Figure 15:
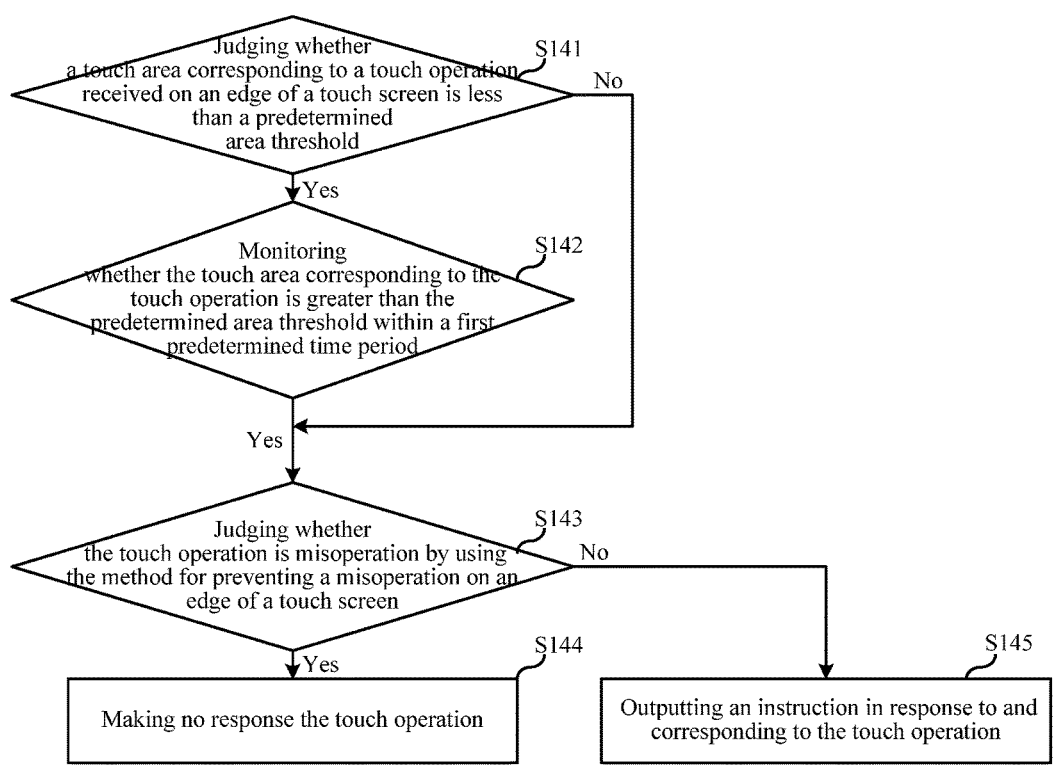
FIG. 15 is a flowchart of a method for processing a touch operation on an edge of a touch screen according to another embodiment of the present disclosure.

FIG. 15 is a flowchart of a method for processing a touch operation on an edge of a touch screen according to another embodiment of the present disclosure.

As shown in FIG. 15, the method for processing a touch operation on an edge of a touch screen may include the following steps.

S141: judging whether a touch area corresponding to a touch operation received on an edge of a touch screen is less than a predetermined area threshold. If the touch area corresponding to the touch operation received on the edge of the touch screen is less than the predetermined area threshold, step S142 is performed; otherwise, step S143 is performed.

The predetermined area threshold is a predetermined touch area threshold.

It should be noted that the predetermined area threshold may be configured to different values according to actual needs to accommodate different application scenarios.

S142: monitoring, within a first predetermined time period, whether the touch area corresponding to the touch operation is greater than the predetermined area threshold. If the touch area corresponding to the touch operation is greater than the predetermined area threshold, step S143 is performed.

The first predetermined time period is a predetermined time period for detecting the touch operation. For example, the first predetermined time period may be 100 ms.

It should be noted that the first predetermined time period may be configured to different values according to actual needs to accommodate different application scenarios.

Specifically, when the touch screen is not fully contacted, judgment of the touch region is not stable, and thus the touch operation may not be determined as misoperation. In this case, touch positions corresponding to the touch operation may be stored, judgment on the above valid touches in the touch region may be constantly performed within the first predetermined time period, e.g. 100 ms, starting from the time when a touch appearing on the edge of the touch screen, and no coordinate is output during the judgment.

S143: judging, by using the method for preventing a misoperation on an edge of a touch screen, whether the touch operation is misoperation. If the touch operation is determined as misoperation, step S144 is performed; and if the touch operation is determined as normal operation, step S145 is performed.

The specific process of judging whether the touch operation is misoperation by using the method for preventing a misoperation on an edge of a touch screen may be referenced to the description of the third embodiment, and is thus not described herein any further.

S144: performing no response to the touch operation.

That is, a touch event corresponding to the touch operation is not reported, such that impacts caused by the misoperation to the user are reduced.

S145: outputting an instruction in response to and corresponding to the touch operation.

It should be noted that in an embodiment of the present disclosure, after it is determined within the first predetermined time period that the touch operation is normal operation, if it is detected that the touch points corresponding to the touch operation disappear within the first predetermined time period, it may be determined that the touch event corresponding to the touch operation is tap event, and a corresponding application may be started according to the touch position tapped by the user.

In addition, in an embodiment of the present disclosure, if touch operation is initially detected on the edge of the touch screen, a touch position of the touch operation may be backed up, and timing may be started from the time when the touch operation is initially detected on the edge of the touch screen. If it is detected that the touch points corresponding to the touch operation have a greater displacement within the first predetermined time period, the touch operation may be determined as a valid touch, and normal touch points are output after the initial touch position is output. In this way, the problem that the edge has no output when a finger slides from the edge of the touch screen to the inner region of the touch screen is improved.

According to the method for processing a touch operation on an edge of a touch screen, when a touch operation is received on the edge of the touch screen, whether the touch area corresponding to the touch operation is less than the predetermined area threshold is judged. If the touch area corresponding to the touch operation is less than the predetermined area threshold, whether the touch operation within the first predetermined time period is misoperation is further judged. If it is determined that the touch operation is misoperation, no response is made to the touch operation. In this way, misoperations are accurately identified, and accuracy of misoperation identification is improved.

To practice the above embodiments, the present disclosure further provides an apparatus for preventing a misoperation on an edge of a touch screen.

Figure 16:
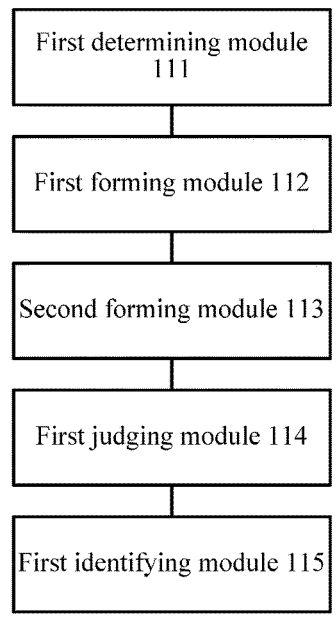
FIG. 16 is a structural schematic diagram of an apparatus for preventing a misoperation on an edge of a touch screen according to an embodiment of the present disclosure.

FIG. 16 is a structural schematic diagram of an apparatus for preventing a misoperation on an edge of a touch screen according to an embodiment of the present disclosure.

As shown in FIG. 16, the apparatus for preventing a misoperation on an edge of a touch screen may include a first determining module 111, a first forming module 112, a second forming module 113, a first judging module 114 and a first identifying module 115.

The first determining module 111 is configured to determine a first touch region according to a touch operation on an edge of a touch screen.

The first determining module 111 is specifically configured to acquire a value of capacitance variation of each touch point according to the touch operation on the edge of the touch screen, and determine a region defined by touch points whose values of capacitance variation are greater than a touch threshold as the first touch region.

The first forming module 112 is configured to form a second touch region according to coordinate information of touch points in the first touch region.

The first forming module 112 is specifically configured to: acquire a horizontal coordinate and a vertical coordinate of each touch point in the first touch region; extract a maximum value and a minimum value of the horizontal coordinates and the vertical coordinates of the touch points in the first touch region; and form the second touch region according to the maximum value and the minimum value of the horizontal coordinates and the maximum value and the minimum value of the vertical coordinates.

The second forming module 113 is configured to form a third touch region according to a longest column in the second touch region and a column on a left side of the longest column if touch points in the second touch region are arranged as parallel to a right edge of the touch screen.

The first judging module 114 is configured to judge whether a length-to-width ratio of the third touch region is less than or equal to a predetermined threshold.

The first identifying module 115 is configured to determine that the touch operation is normal operation if the length-to-width ratio of the third touch region is less than or equal to the predetermined threshold.

The second identifying module 116 is configured to determine that the touch operation is misoperation if the length-to-width ratio of the third touch region is greater than the predetermined threshold.

Figure 17:
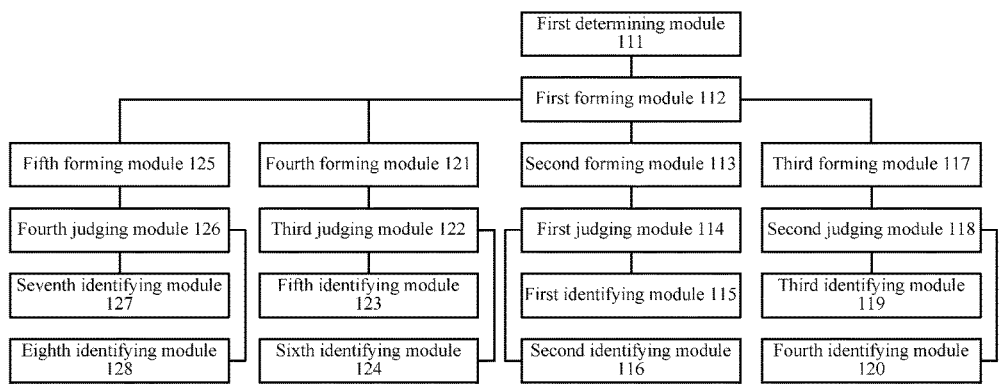
FIG. 17 is a structural schematic diagram of an apparatus for preventing a misoperation on an edge of a touch screen according to another embodiment of the present disclosure.

In an embodiment of the present disclosure, as shown in FIG. 17, the apparatus may further include a third forming module 117, a second judging module 118, a third identifying module 119 and a fourth identifying module 120.

The third forming module 117 is configured to form a fourth touch region according to a longest column in the second touch region and a column on a right side of the longest column if touch points in the second touch region are arranged as parallel to a left edge of the touch screen.

The second judging module 118 is configured to judge whether a length-to-width ratio of the fourth touch region is less than or equal to a predetermined threshold.

The third identifying module 119 is configured to determine that the touch operation is normal operation if the length-to-width ratio of the fourth touch region is less than or equal to the predetermined threshold.

The fourth identifying module 120 is configured to determine that the touch operation is misoperation if the length-to-width ratio of the fourth touch region is greater than the predetermined threshold.

In an embodiment of the present disclosure, as shown in FIG. 17, the apparatus may further include a fourth forming module 121, a third judging module 122, a fifth identifying module 123 and a sixth identifying module 124.

The fourth forming module 121 is configured to form a fifth touch region according to a longest row in the second touch region and the number of rows on a lower side of the longest row if touch points in the second touch region are arranged as parallel to an upper edge of the touch screen.

The third judging module 122 is configured to judge whether a length-to-width ratio of the fifth touch region is less than or equal to a predetermined threshold.

The fifth identifying module 123 is configured to determine that the touch operation is normal operation if the length-to-width ratio of the fifth touch region is less than or equal to the predetermined threshold.

The sixth identifying module 124 is configured to determine that the touch operation is misoperation if the length-to-width ratio of the fifth touch region is greater than the predetermined threshold.

In an embodiment of the present disclosure, as shown in FIG. 17, the apparatus may further include a fifth forming module 125, a fourth judging module 126, a seventh identifying module 127 and an eighth identifying module 128.

The fifth forming module 125 is configured to form a sixth touch region according to a longest row in the second touch region and the number of rows on an upper side of the longest row if touch points in the second touch region are arranged as parallel to a lower edge of the touch screen.

The fourth judging module 126 is configured to judge whether a length-to-width ratio of the sixth touch region is less than or equal to a predetermined threshold.

The seventh identifying module 127 is configured to determine that the touch operation is normal operation if the length-to-width ratio of the sixth touch region is less than or equal to the predetermined threshold.

The eighth identifying module 128 is configured to determine that the touch operation is misoperation if the length-to-width ratio of the sixth touch region is greater than the predetermined threshold.

It should be noted that the above interpretation and description of the method embodiments for preventing a misoperation on an edge of a touch screen may also be used to illustrate the apparatus for preventing a misoperation on an edge of a touch screen according to this embodiment, and are thus not described herein any further.

With the apparatus for preventing a misoperation on an edge of a touch screen according to the embodiment of the present disclosure, a first touch region is determined according to touch operations on an edge of a touch screen. A second touch region is formed according to coordinate information of touch points in the first touch region. If the touch points in the second touch region are arranged as parallel to a right edge of the touch screen, a third touch region is formed according to a longest column in the second touch region and a column on a left side of the longest column. Whether a length-to-width ratio of the third touch region is less than or equal to a predetermined threshold is judged. If the length-to-width ratio is less than or equal to the predetermined threshold, it is determined that the touch operation is normal operation. In this way, misoperations are correctly identified, and thus accuracy of misoperation identification is improved.

Figure 18:
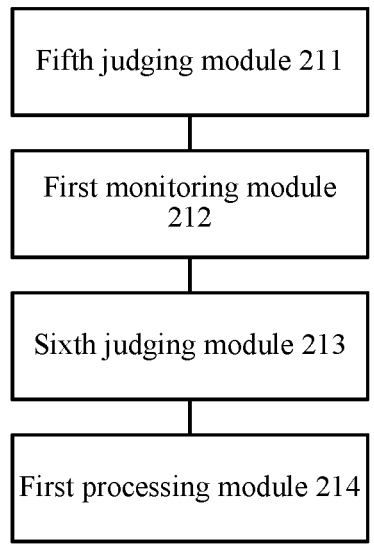
FIG. 18 is a structural schematic diagram of an apparatus for processing a touch operation on an edge of a touch screen according to an embodiment of the present disclosure.

FIG. 18 is a structural schematic diagram of an apparatus for processing a touch operation on an edge of a touch screen according to an embodiment of the present disclosure.

As shown in FIG. 18, the apparatus for processing a touch operation on an edge of a touch screen may include a fifth judging module 211, a first monitoring module 212, a sixth judging module 213 and a first processing module 214.

The fifth judging module 211 is configured to judge whether a touch area corresponding to a touch operation received on an edge of a touch screen is less than a predetermined area threshold.

The first monitoring module 212 is configured to within a first predetermined time period, monitor whether the touch area corresponding to the touch operation is greater than the predetermined area threshold if the touch area corresponding to the touch operation received on the edge of the touch screen is less than the predetermined area threshold.

The sixth judging module 213 is configured to judge whether the touch operation is misoperation by using the apparatus for preventing a misoperation on an edge of a touch screen as described in the fifth embodiment if it is monitored that the touch area corresponding to the touch operation is greater than the predetermined area threshold within the first predetermined time period.

The first processing module 214 is configured to perform no response to the touch operation if it is determined that the touch operation is misoperation.

Figure 19:
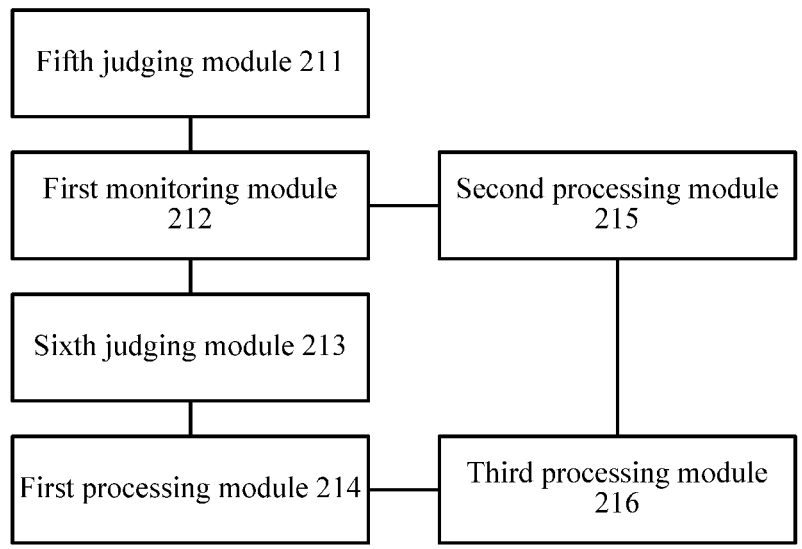
FIG. 19 is a structural schematic diagram of an apparatus for processing a touch operation on an edge of a touch screen according to another embodiment of the present disclosure.

In an embodiment of the present disclosure, as shown in FIG. 19, the apparatus may further include a second processing module 215.

The second processing module 215 is configured to judge whether the touch operation is misoperation by using the apparatus for preventing a misoperation on an edge of a touch screen as described in the fifth embodiment if it is monitored that the touch area corresponding to the touch operation received on the edge of the touch screen is greater than or equal to the predetermined area threshold.

In an embodiment of the present disclosure, as shown in FIG. 19, the apparatus may further include a third processing module 216.

The third processing module 216 is configured to output an instruction for performing response to the touch operation if it is determined that the touch operation is normal operation.

It should be noted that the above interpretation and description of the method embodiments for processing a touch operation on an edge of a touch screen according to the second embodiment may also be used to illustrate the apparatus for processing a touch operation on an edge of a touch screen according to this embodiment, and are thus not described herein any further.

According to the apparatus for processing a touch operation on an edge of a touch screen, when a touch operation is received on the edge of the touch screen, whether the touch area corresponding to the touch operation is less than the predetermined area threshold is judged. If the touch area corresponding to the touch operation is less than the predetermined area threshold, whether the touch operation within the first predetermined time period is misoperation is further judged. If it is determined that the touch operation is misoperation, no response is made to the touch operation. In this way, misoperations are accurately identified, and accuracy of misoperation identification is improved.

Figure 20:
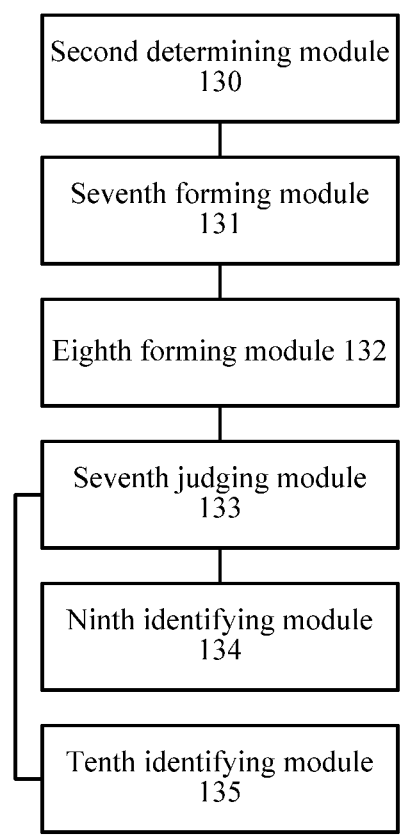
FIG. 20 is a structural schematic diagram of an apparatus for preventing a misoperation on an edge of a touch screen according to still another embodiment of the present disclosure.

FIG. 20 is a structural schematic diagram of an apparatus for preventing a misoperation on an edge of a touch screen according to yet still another embodiment of the present disclosure.

As shown in FIG. 20, the apparatus for processing a touch operation on an edge of a touch screen may include: a second determining module 130, a seventh forming module 131, an eighth forming module 132, a seventh judging module 133, a ninth identifying module 134, and a tenth identifying module 135.

A second determining module 130 is configured to determine a first touch region according to a touch operation on an edge of a touch screen.

The second determining module 130 is specifically configured to acquire a value of capacitance variation of each touch point according to the touch operation on the edge of the touch screen, and determine a region defined by touch points whose values of capacitance variation are greater than a touch threshold as the first touch region.

A seventh forming module 131 is configured to form a second touch region according to coordinate information of touch points in the first touch region.

The seventh forming module 131 is specifically configured to: acquire a horizontal coordinate and a vertical coordinate of each touch point in the first touch region, extract a maximum value and a minimum value of the horizontal coordinates and the vertical coordinates of the touch points in the first touch region, and form the second touch region according to the maximum value and the minimum value of the horizontal coordinates and the maximum value and the minimum value of the vertical coordinates.

An eighth forming module 132 is configured to determine a longest column in the second touch region if the touch points in the second touch region are arranged as parallel to a left edge or a right edge of the touch screen, and rectify the second touch region according to the number of columns on a left side of the longest column and the number of columns on a right side of the longest column, to form a seventh touch region.

A seventh judging module 133 is configured to judge whether a length-to-width ratio of the seventh touch region is less than or equal to a predetermined threshold.

A ninth identifying module 134 is configured to determine that the touch operation is normal operation if the length-to-width ratio of the seventh touch region is less than or equal to the predetermined threshold.

A tenth identifying module 135 is configured to determine that the touch operation is misoperation if the length-to-width ratio of the seventh touch region is greater than the predetermined threshold.

Figure 21:
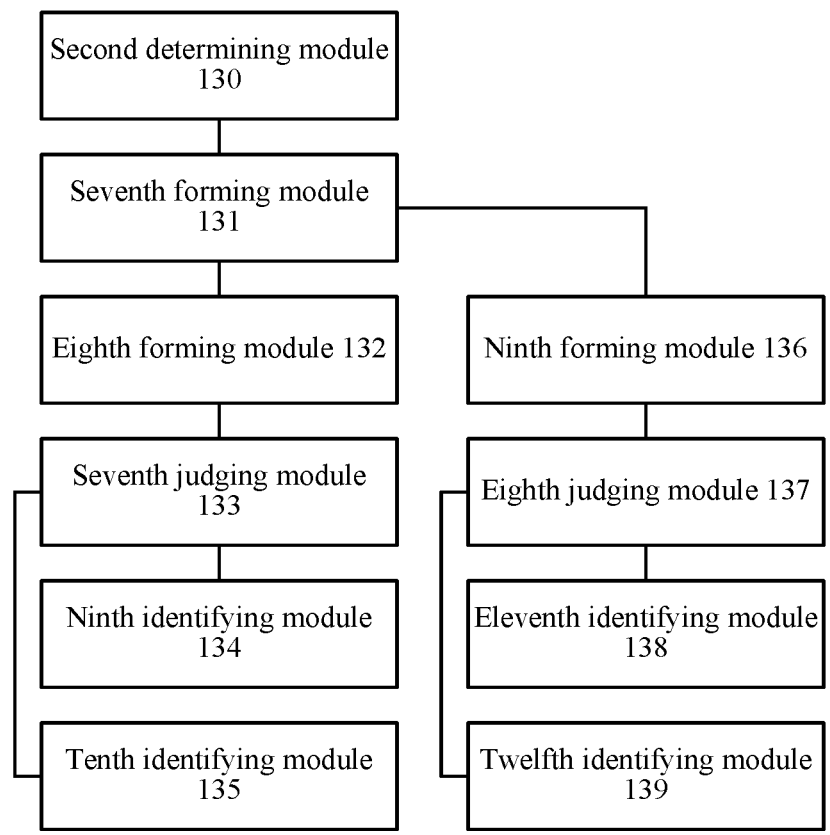
FIG. 21 is a flowchart of an apparatus for preventing a misoperation on an edge of a touch screen according to yet still another embodiment of the present disclosure.

In an embodiment of the present disclosure, as shown in FIG. 21, the apparatus may further include: a ninth forming module 136, an eight judging module 137, an eleventh identifying module 138, and a twelfth identifying module 139.

A ninth forming module 136 is configured to determine a longest row in the second touch region if the touch points in the second touch region are arranged as parallel to an upper edge or a lower edge of the touch screen, and rectify the second touch region according to the number of rows on an upper side of the longest row and the number of rows on a lower side of the longest row, to form an eighth touch region.

An eight judging module 137 is configured to judge whether a length-to-width ratio of the eighth touch region is less than or equal to a predetermined threshold.

An eleventh identifying module 138 is configured to determine that the touch operation is normal operation if the length-to-width ratio of the eighth touch region is less than or equal to the predetermined threshold.

A twelfth identifying module 139 is configured to determine that the touch operation is misoperation if the length-to-width ratio of the eighth touch region is greater than the predetermined threshold.

It should be noted that the above interpretation and description of the method embodiments for preventing a misoperation on an edge of a touch screen may also be used to illustrate the apparatus for preventing a misoperation on an edge of a touch screen, and are thus not described herein any further.

With the apparatus for preventing a misoperation on an edge of a touch screen according to the embodiment of the present disclosure, a first touch region is determined according to a touch operation on an edge of a touch screen. A second touch region is formed according to coordinate information of touch points in the first touch region. A longest row in the second touch region is determined if it is determined that touch points in the second touch region are arranged as parallel to an upper edge or a lower edge of the touch screen. The second touch region is rectified according to a row on a left side of the longest row and a row on a right side of the longest row, to form an eighth touch region. And the touch operation is determined as normal operation if it is determined that a length-to-width ratio of the eighth touch region is less than or equal to a predetermined threshold. In this way, misoperations are accurately identified, and accuracy of misoperation identification is improved.

Figure 22:
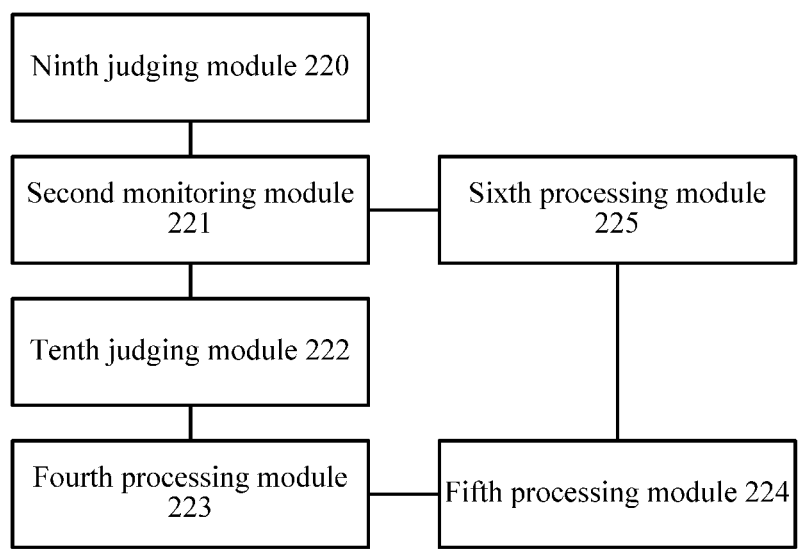
FIG. 22 is a structural schematic diagram of an apparatus for preventing a misoperation on an edge of a touch screen according to yet still another embodiment of the present disclosure.

FIG. 22 is a structural schematic diagram of an apparatus for preventing a misoperation on an edge of a touch screen according to yet still another embodiment of the present disclosure.

As shown in FIG. 22, the apparatus for processing a touch operation on an edge of a touch screen may include: a ninth judging module 220, a second monitoring module 221, a tenth judging module 222, a fourth processing module 223.

A ninth judging module 220 is configured to judge whether a touch area corresponding to a touch operation received on an edge of a touch screen is less than a predetermined area threshold.

A second monitoring module 221 is configured to monitor whether the touch area corresponding to the touch operation is greater than the predetermined area threshold within a first predetermined time period if the touch area corresponding to the touch operation received on the edge of the touch screen is less than the predetermined area threshold.

A tenth judging module 222 is configured to judge whether the touch operation is misoperation by using the apparatus for preventing a misoperation on an edge of a touch screen as described in the seventh embodiment if it is monitored that the touch area corresponding to the touch operations is greater than the predetermined area threshold within the first predetermined time period.

A fourth processing module 223 is configured to perform no response to the touch operation if it is determined that the touch operation is misoperation.

In an embodiment of the present disclosure, as shown in FIG. 22, the apparatus may further include a fifth processing module 224. The fifth processing module 224 is configured to judge whether the touch operation is misoperation by using the apparatus for preventing a misoperation on an edge of a touch screen as described in the seventh embodiment if it is monitored that the touch area corresponding to the touch operation received on the edge of the touch screen is greater than or equal to the predetermined area threshold.

In an embodiment of the present disclosure, as shown in FIG. 22, the apparatus may further include a sixth processing module 225.

The sixth processing module 225 is configured to output an instruction for performing response to the touch operation if it is determined that the touch operation is normal operation.

It should be noted that the above interpretation and description of the method for processing a touch operation on an edge of a touch screen may also be used to illustrate the apparatus for processing a touch operation on an edge of a touch screen according to this embodiment, and are thus not described herein any further.

According to the apparatus for processing a touch operation on an edge of a touch screen, when a touch operation are received on the edge of the touch screen, whether the touch area corresponding to the touch operation is less than the predetermined area threshold is judged. If the touch area corresponding to the touch operation is less than the predetermined area threshold, whether the touch operation is misoperation is further judged within the first predetermined time period. If it is determined that the touch operation is misoperation, no response is made to the touch operation. In this way, misoperations are accurately identified, and accuracy of misoperation identification is improved.

In the description of the present description, reference terms such as "an embodiment", "some embodiments", "an example", "a specific example", "some examples", or the like are intended to refer to that a specific feature, structure, material, or characteristic which are described in combination with the embodiments or examples are included in at least one embodiment or example of the present disclosure. In this specification, schematic expressions of the above terms do not necessarily indicate the same embodiments or examples. In addition, the described specific feature, structure, material, or characteristic may be combined in any one or multiple embodiments or examples in a suitable way. In addition, in case of no contradiction, a person skilled in the art may incorporate or combine different embodiments or examples and features of different embodiments or examples described in this specification.

In addition, terms of "first", "second" are only used for description, but shall not be understood as indication or implication of relative importance or implicit indication of the number of the specific technical feature. Therefore, the feature defined by the terms "first" and "second" may explicitly or implicitly comprise at least one of the features. In the description of the present disclosure, the term "more" or "a plurality of" signifies at least two, e.g. two, three, etc. unless otherwise specified.

Any process or method description shown in a flowchart or described herein in any manner may be understood as including one or a plurality of modules, segments or portions of codes of executable instructions for implementing specific logic functions or steps in a process. In addition, the scope of a preferred embodiment of the present disclosure covers other implementations. The implementation of the functions or steps may not be subjected to the shown or discussed sequence; however, the functions may be implemented in a substantially simultaneous manner or in a contrary sequence according to the involved functions, which shall be understood by a person skilled in the art according to the embodiments of the present disclosure.

Any logic and/or step shown in a flowchart or described herein in any way, for example, may be considered as ordered listings of executable instructions for implementing a logical function, and may be embodied in any computer-readable medium for use by or in connection with an instruction system, apparatus or device (for example, a computer-based system, processor-containing system, or other system that is capable of fetching the instructions from the instruction execution system, apparatus, or device and execute the instructions). In the context of this document, a "computer-readable medium" may be any means that can store, communicate, propagate, or transport the program for use by or in connection with the instruction execution system, apparatus, or device. The computer-readable medium may include the following: an electrical connection (electronic) having one or more wires, a portable computer diskette (magnetic), a random access memory (RAM), a read-only memory (ROM), an erasable programmable read-only memory (EPROM, or a flash memory), an optical fiber, and a portable compact disc memory (CDROM). In addition, it is to be noted that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

It should be understood that each part of the present disclosure may be implemented by using hardware, software, firmware or a combination of them. In the above embodiments, the multiple steps or methods may be implemented by using software or firmware which is stored in a memory and executed by a suitable instruction execution system. For example, if the multiple steps or methods are implemented by using hardware, similar to another embodiment, the steps or methods may be implemented by using any one or a combination of the following technologies that are commonly known in the art: a discrete logic circuit of a logic gate circuit configured to implement logic function to data signals, an application specific integrated circuit having a suitable combinational logic gate, a programmable gate array (PGA), a field-programmable gate array (FPGA), and the like.

Persons of ordinary skill in the art may understand that all or part of the steps of the methods in the embodiments may be implemented by a program instructing relevant hardware. The program may be stored in a computer readable storage medium. When the program runs, one of the steps or a combination of them is included in the method embodiments.

In addition, various function units according to the embodiments of the present disclosure may be integrated in a processing module, or may be each independently and physically present; alternatively, one or more than one units are integrated in a module. The above integrated module may be implemented by using hardware, and may also be implemented by using a software function module. If the integrated module is implemented by using the software function module, and is sold or used as an independent product, the integrated module may also be stored in a computer readable storage medium.

The above mentioned storage medium may be a read only memory, a magnetic disk, a compact disc-read only memory or the like. Although the above description illustrates the embodiments of the present disclosure, it can be understood that the embodiments are merely exemplary, and shall not be construed as limitations to the present disclosure. Persons of ordinary skill in the art may derive variations, modifications, and replacements to the above embodiments within the scope of the present disclosure.

What is claimed is:

1. A method for preventing a misoperation on an edge of a touch screen, comprising:

determining a first touch region according to values of capacitance variation of touch points corresponding to a touch operation on an edge of a touch screen;

forming a second touch region that is a rectangular region according to coordinate information of touch points in the first touch region; and forming, wherein the touch points in the second touch region that are close to a right edge of the touch screen are arranged as parallel to the right edge of the touch screen, a third touch region having boundaries comprising of a longest column and an outermost column on a left side of the longest column in the second touch region, judging whether a length-to-width ratio of the third touch region is less than or equal to a first predetermined threshold, and determining that the touch operation is a normal operation if the length-to-width ratio is less than or equal to the predetermined threshold, and, determining that the touch operation is a misoperation if the length-to-width ratio is greater than the predetermined threshold; or forming, wherein the touch points in the second touch region that are close to a left edge of the touch screen are arranged as parallel to the left edge of the touch screen, a fourth touch region having boundaries comprising of a longest column and an outermost column on a right side of the longest column in the second touch region, judging whether a length-to-width ratio of the fourth touch region is less than or equal to a second predetermined threshold, and determining that the touch operation is a normal operation if the length-to-width ratio is less than or equal to the second predetermined threshold, and determining that the touch operation is a misoperation if the length-to-width ratio is greater than the second predetermined threshold; or forming, wherein the touch points in the second touch region that are close to an upper edge of the touch screen are arranged as parallel to the upper edge of the touch screen, a fifth touch region having boundaries comprising of a longest row and an outermost row on a lower side of the longest row in the second touch region, judging whether a length-to-width ratio of the fifth touch region is less than or equal to a third predetermined threshold, and determining that the touch operation is a normal operation if the length-to-width ratio is less than or equal to the third predetermined threshold, and, determining that the touch operation is a misoperation if the length-to-width ratio is greater than the third predetermined threshold; or forming, wherein the touch points in the second touch region that are close to a lower edge of the touch screen are arranged as parallel to the lower edge of the touch screen, a sixth touch region having boundaries comprising of a longest row and an outermost row on an upper side of the longest row in the second touch region, judging whether a length-to-width ratio of the sixth touch region is less than or equal to a fourth predetermined threshold, and determining that the touch operation is a normal operation if the length-to-width ratio is less than or equal to the fourth predetermined threshold, and determining that the touch operation is a misoperation if the length-to-width ratio is greater than the fourth predetermined threshold;

wherein the longest column is a column in the second touch region having a largest number of values of capacitance variation of touch points which exceed a touch threshold of capacitance value;

wherein the longest row is a row in the second touch region having a largest number of values of capacitance variation of touch points which exceed the touch threshold of capacitance value.

2. The method for preventing a misoperation on an edge of a touch screen according to claim 1, wherein the determining a first touch region according to values of capacitance variation of touch points corresponding to a touch operation on an edge of a touch screen comprises:

acquiring a value of capacitance variation of each touch point according to the touch operation on the edge of the touch screen; and determining a region defined by touch points whose values of capacitance variation are greater than the touch threshold as the first touch region.

3. The method for preventing a misoperation on an edge of a touch screen according to claim 1, wherein the forming a second touch region that is a rectangular region according to coordinate information of touch points in the first touch region comprises:

acquiring a horizontal coordinate and a vertical coordinate of each touch point in the first touch region;

extracting a maximum value and a minimum value of the horizontal coordinates and a maximum value and a minimum value of the vertical coordinates of the touch points in the first touch region; and forming the second touch region according to the maximum value and the minimum value of the horizontal coordinates and the maximum value and the minimum value of the vertical coordinates.

4. The method for preventing a misoperation on an edge of a touch screen according to claim 1, further comprising:

judging whether the touch operation on the edge of the touch screen is an initial edge touch operation;

starting timing and judging within a predetermined delay period whether the touch operation is a misoperation if the touch operation is an initial edge touch operation;

performing response to the touch operation if it is determined within the predetermined delay period that the touch operation is a normal operation and the timing reaches the predetermined delay period.

5. The method for preventing a misoperation on an edge of a touch screen according to claim 1, further comprising:

judging whether a touch area of the first touch region is less than a predetermined area threshold;

monitoring, if the touch area of the first region is less than the pre determined area threshold, whether the touch area of the first region is greater than the predetermined area threshold within a first predetermined time period;

judging whether the touch operation is a misoperation if it is monitored that the touch area of the first region is greater than or equal to the predetermined area threshold within the first predetermined time period; and performing no response to the touch operation if it is determined that the touch operation is a misoperation.

6. The method for preventing a misoperation on an edge of a touch screen according to claim 5, further comprising:

outputting an instruction for performing response to the touch operation if it is determined that the touch operation is a normal operation.

7. An apparatus for preventing a misoperation on an edge of a touch screen, comprising:

a non-transitory storage medium having machine-readable instructions which, when executed by one or more processors, are configured to:

determine a first touch region according to values of capacitance variation of touch points corresponding to a touch operation on an edge of a touch screen;

form a second touch region that is a rectangular region according to coordinate information of touch points in the first touch region;

form a third touch region having boundaries comprising of a longest column and an outermost column on a left side of the longest column in the second touch region wherein touch points in the second touch region that are close to a right edge of the touch screen are arranged as parallel to the right edge of the touch screen, judge whether a length-to-width ratio of the third touch region is less than or equal to a first predetermined threshold, determine that the touch operation is a normal operation when the length-to-width ratio of the third touch region is less than or equal to the first predetermined threshold and determine that the touch operation is a misoperation when the length-to-width ratio of the third touch region is greater than the first predetermined threshold; or form a fourth touch region having boundaries comprising of a longest column and an outermost column on a right side of the longest column in the second touch region wherein touch points in the second touch region that are close to a left edge of the touch screen are arranged as parallel to the left edge of the touch screen, judge whether a length-to-width ratio of the fourth touch region is less than or equal to a second predetermined threshold, determine that the touch operation is a normal operation when the length-to-width ratio of the fourth touch region is less than or equal to the second predetermined threshold, and determine that the touch operation is a misoperation when the length-to-width ratio of the fourth touch region is greater than the second predetermined threshold; or form a fifth touch region having boundaries comprising of a longest row and an outermost row on a lower side of the longest row in the second touch region wherein touch points in the second touch region that are close to an upper edge of the touch screen are arranged as parallel to the upper edge of the touch screen, judge whether a length-to-width ratio of the fifth touch region is less than or equal to a third predetermined threshold, determine that the touch operation is a normal operation when the length-to-width ratio of the fifth touch region is less than or equal to the third predetermined threshold, and determine that the touch operation is a misoperation when the length-to-width ratio of the fifth touch region is greater than the third predetermined threshold; or form a sixth touch region having boundaries comprising of a longest row and an outermost row on an upper side of the longest row in the second touch region wherein touch points in the second touch region that are close to a lower edge of the touch screen are arranged as parallel to the lower edge of the touch screen, judge whether a length-to-width ratio of the sixth touch region is less than or equal to a fourth predetermined threshold, determine that the touch operation is a normal operation when the length-to-width ratio of the sixth touch region is less than or equal to the fourth predetermined threshold, and determine that the touch operation is a misoperation when the length-to-width ratio of the sixth touch region is greater than the fourth predetermined threshold;

wherein the longest column is a column in the second touch region having a largest number of values of capacitance variation of touch points which exceed a touch threshold of capacitance value;

wherein the longest row is a row in the second touch region having a largest number of values of capacitance variation of touch points which exceed the touch threshold of capacitance value.

8. The apparatus for preventing a misoperation on an edge of a touch screen according to claim 7, wherein the machine-readable instructions are further configured to:

acquire a value of capacitance variation of each touch point according to the touch operation on the edge of the touch screen; and determine a region defined by touch points whose values of capacitance variation are greater than the touch threshold as the first touch region.

9. The apparatus for preventing a misoperation on an edge of a touch screen according to claim 7, wherein the machine-readable instructions are further configured to:

acquire a horizontal coordinate and a vertical coordinate of each touch point in the first touch region;

extract a maximum value and a minimum value of the horizontal coordinates and the vertical coordinates of the touch points in the first touch region; and form the second touch region according to the maximum value and the minimum value of the horizontal coordinates and the maximum value and the minimum value of the vertical coordinates.

10. The apparatus for preventing a misoperation on an edge of a touch screen according to claim 7, wherein the machine-readable instructions are further configured to:

judge whether the touch operation on the edge of the touch screen is an initial edge touch operation, judge within a predetermined delay period whether the touch operation is a misoperation when the touch operation is an initial edge touch operation, and perform response to the touch operation when it is constantly determined within the predetermined delay period that the touch operation is a normal operation and timing reaches the predetermined delay period.

11. The apparatus for preventing a misoperation on an edge of a touch screen according to claim 7, wherein the machine-readable instructions are further configured to:

judge whether a touch area of the first touch region is less than a predetermined area threshold;

monitor whether the touch area of the first touch region is greater than the predetermined area threshold within a first predetermined time period when the touch area of the first touch region is less than the predetermined area threshold;

judge whether the touch operation is a misoperation when it is monitored that the touch area of the first touch region is greater than the predetermined area threshold within the first predetermined time period; and perform no response to the touch operation when it is determined that the touch operation is a misoperation.

12. The apparatus for preventing a misoperation on an edge of a touch screen according to claim 11, wherein the machine-readable instructions are further configured to:

output an instruction for performing response to the touch operation when it is determined that the touch operation is a normal operation.

13. The apparatus for preventing a misoperation on an edge of a touch screen according to claim 7, wherein the machine-readable instructions are further configured to:

rectify the second touch region according to the number of columns on a left side of the longest column and the number of columns on a right side of the longest column.

14. The apparatus for preventing a misoperation on an edge of a touch screen according to claim 7, wherein the machine-readable instructions are further configured to:

rectify the second touch region according to the number of rows on an upper side of the longest row and the number of rows on a lower side of the longest row.

* * * * *